Patented June 20, 1950

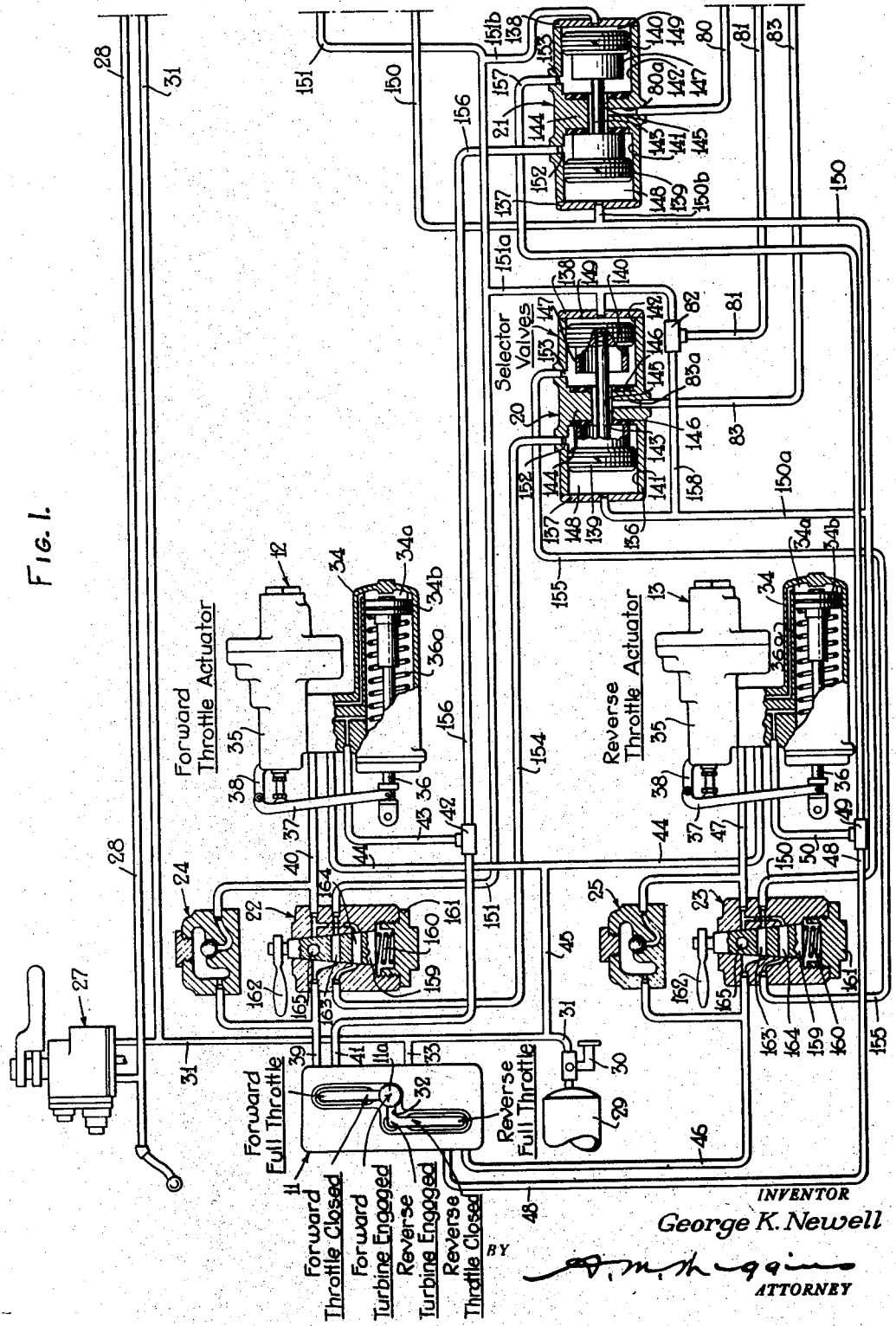

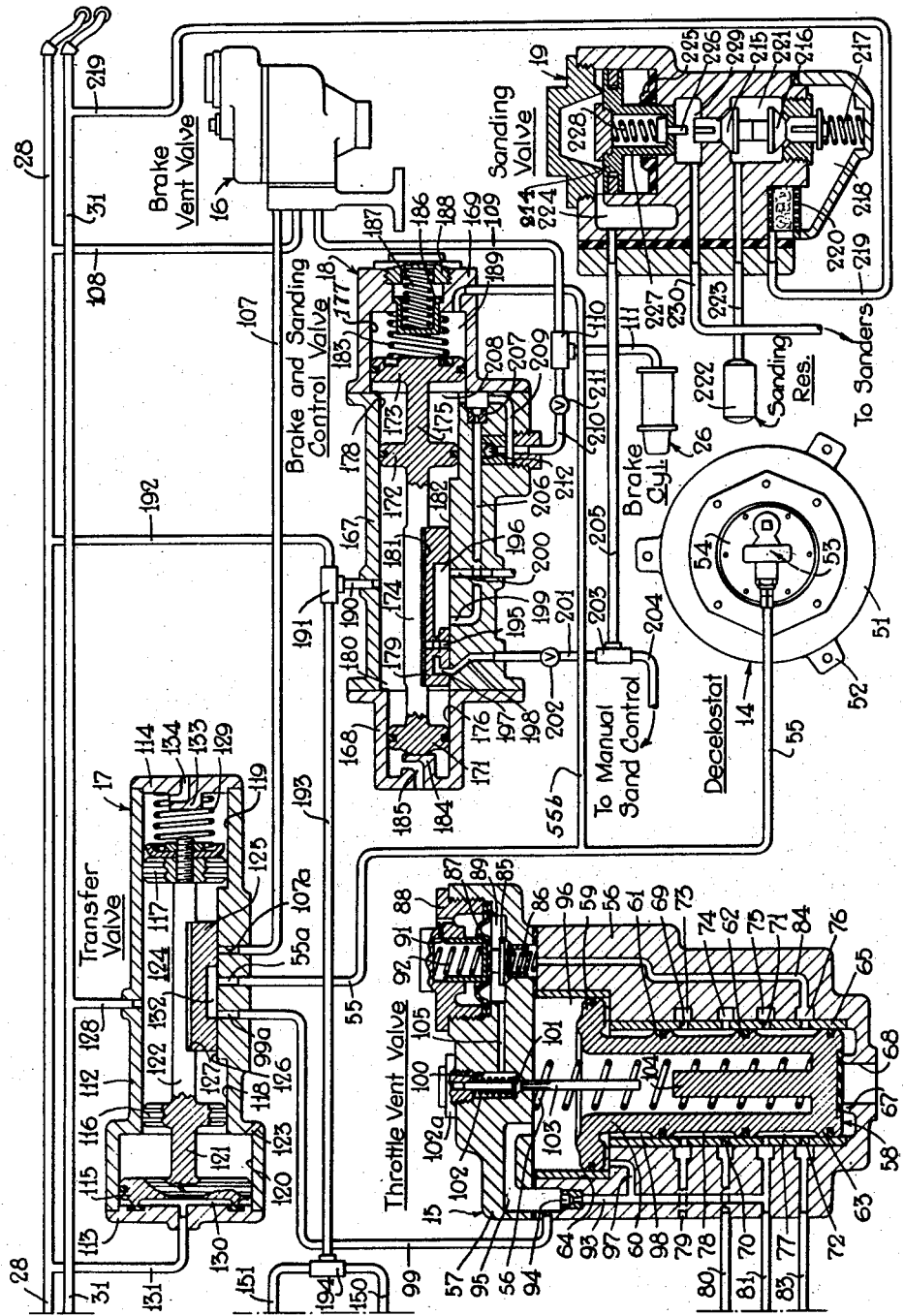

2,512,035

UNITED STATES PATENT OFFICE 2,512,035

APPARATUS FOR CONTROLLING SLIP OF VEHICLE WHEELS

George K. Newell, near Pitcairn, Pa., assignor to The Westinghouse Air Brake Company, Wilmerding, Pa., a corporation of Pennsylvania Application May 8, 1945, Serial No. 592,700

34 Claims. (Cl. 291—2)

This invention relates to apparatus for controlling slip of vehicle wheels, such as the wheels of a railway locomotive, and has particular relation to control apparatus including means operative in response to the slipping of the driver wheels of the vehicle or locomotive caused by excessive propulsion power or excessive braking power, for automatically terminating the slipping condition.

The term "slip" or "slipping condition," as employed herein in connection with vehicle wheels, refers to rotation of the wheels at a speed greater or less than a speed corresponding to actual speed of vehicle travel at a given instant. For convenience in distinguishing between a wheel slip condition occurring due to excessive braking power and one occurring due to excessive propulsion power, the slipping condition of the driver wheels of a vehicle induced by excessive propulsion power may sometimes be referred to hereinafter as a "spin" or a "spinning condition." It will be understood, however, that the term "slipping condition" and its variants may be employed hereinafter, particularly in the claims, interchangeably with the term "spinning condition" and its variants.

For purposes of illustration, my invention is disclosed herein in connection with a pneumatic brake and throttle control apparatus for a locomotive of the steam turbine driven type, although it is applicable to any type of propulsion or brake control, either of the electrical or mechanical type, applied to steam driven locomotives of the reciprocating type, locomotives of the Diesel-electric type or locomotives of the purely electrical type. Essentially, the apparatus comprising my present invention includes propulsion power control means operative to cut off propulsion power to the driver wheels of the locomotive, brake control means for effecting an application of the brakes on the driver wheels, sanding control means, and means responsive to the slipping of the driver wheels of the locomotive during propulsion for effecting concurrent operation of the propulsion power control means, the brake control means and the sanding means so as to automatically cut off propulsion power, effect a brake application on the driver wheels, and effect sanding of the rails whenever spinning of the wheels during propulsion is initiated. By reason of the high speed operation of the rotor element of the steam driven turbines on turbine driven locomotives the problem of spinning of the driver wheels is accentuated due to the high momentum or kinetic energy developed in the rotor of the turbine. My invention is therefore designed not only to cut off the propulsion power but to effect a brake application on the driver wheels and a sanding operation as well, in order to more effectively and rapidly terminate the spinning condition.

According to my invention, I further provide in combination with the previously described control apparatus, brake control means operative during a brake application to effect a reduction in the degree of a brake application, and means automatically conditioned in response to a brake application for rendering the wheel slip detecting means operative to control the brake control means. In other words, I provide a single wheel slip detecting means operative alternatively to control propulsion control means or brake control means. The arrangement is, furthermore, such that operation of the wheel slip detecting means during a brake application is effective to cause a sanding operation for the duration of the slipping period.

My invention further comprises apparatus associating the wheel slip detecting means with a pneumatic type of throttle control for steam turbine driven locomotives, including separate forward direction and reverse direction throttle controls, whereby protection against the spinning of the driver wheels is afforded for either the forward or the reverse direction of travel of the locomotive.

It is accordingly an object of my present invention to provide apparatus for automatically controlling the application of propulsion power and of the brakes to the driver wheels of a vehicle in a manner to rapidly terminate a slipping condition, induced by excessive propulsion power or excessive braking power, whenever the slipping condition occurs.

It is another object of my invention to provide apparatus of the character indicated in the foregoing object and characterized further by means rendering a single wheel slip detecting means operative to reduce propulsion power or the degree of application of the brakes in a manner to terminate slipping of the wheels during either propulsion or during a brake application.

It is another object of my invention to provide apparatus for automatically effecting a brake application on the driver wheels of a vehicle and/or a sanding operation whenever spinning thereof occurs during propulsion for the purpose of assisting in more effectively and rapidly terminating the spinning condition.

It is another object of my invention to provide apparatus for automatically reducing a degree of a brake application and effecting a sanding operation for the purpose of rapidly terminating the slipping condition of wheels during a brake application.

It is another object of my invention to provide in combination with a pneumatic brake and throttle control apparatus, means responsive to the slipping of the driver wheels during propulsion or during a brake application for pneumatically controlling the application of propulsion power and the application of the brakes to the driver wheels in a manner to rapidly terminate the slipping condition.

The above objects, and other objects of my invention which will be made apparent hereinafter, are attained by means of an embodiment of my invention subsequently to be described and shown in the accompanying drawings wherein Figures 1 and 2, taken together, show the complete equipment.

Description

In the drawings:

Figures 1 and 2, taken together, show the complete apparatus.

My invention is disclosed in Figures 1 and 2 in connection with a pneumatic type of throttle control apparatus employed on the latest type of turbine-driven locomotive but it will be understood that it is applicable and adaptable to other types of propulsion power or throttle control for locomotives of the reciprocating steam type, of the Diesel-electric type, or of the purely electric type.

For simplicity I have shown in the accompanying drawings only so much of the pneumatic throttle control equipment as is necessary for a comprehension of the principles of my invention. For a detailed description and disclosure of a complete pneumatic throttle control equipment for locomotives of the turbine-driven type, reference may be had to the copending application, Serial No. 550,691, now Patent No. 2,501,729 of March 28, 1950, of Harry C. May, filed August 23, 1944 and assigned to the assignee of the present applicaton.

Briefly, turbine-driven locomotives of the type mentioned have a main or forward direction turbine and an auxiliary or reverse direction turbine for driving the driver wheels of the locomotive in a forward and a reverse direction respectively. The forward direction turbine is directly coupled to one or more pairs of driver wheels through a suitable speed reduction gear mechanism. The reverse direction turbine is adapted to be rendered operative to drive the driver wheels by means of a suitable clutch device which is automatically controlled by movement of a manually operated throttle controller. An additional speed reduction gear mechanism functions during operation of the reverse turbine to effect a lower speed for reverse operation than for forward operation. The manual throttle controller comprises a controller handle which is shiftable in a Z-slot formed in the casing of the controller transversely through a transverse portion of the slot to one or the other of the longitudinally extending portions of the Z-slot and then shiftable longitudinally away from the centrally located transverse slot into one or the other of the longitudinal portions to effect the forward throttle control or the reverse throttle control for supplying steam to the forward or reverse turbines selectively. Movement of the controller handle into the reverse throttle portion of the Z-slot automatically effects engagement of the clutch to connect the reverse direction turbine to the driver wheels. Suitable protective apparatus is provided for preventing the movement of the throttle controller handle from a position in the Z-slot, corresponding to forward throttle control, to a position corresponding to reverse throttle control unless the driver wheels are stopped. Suitable apparatus is also provided for effecting automatic closure of the throttle valves controlling the supply of steam to either the forward direction or the reverse direction turbine in the event that the pressure of the oil supplied for lubrication purposes to the turbines drops to an unsafe value.

It will be understood, therefore, that while I have omitted a number of details of the pneumatic throttle control equipment, it is intended that the complete equipment be employed.

Referring to the drawings, the essential devices of the pneumatic throttle control equipment shown are the manually operated throttle controller 11, hereinafter referred to simply as the controller, a forward direction throttle actuator 12, and a reverse direction throttle actuator 13. The controller 11 is shown only in a plan view and the two actuators 12 and 13 are shown in outline form with only a portion in section since reference may be had to the copending application, Serial No. 550,691, referred to above for details of construction and operation of these devices.

According to my invention, the equipment shown in the drawing further comprises a wheel slip detecting device or wheel slip controller 14, a throttle vent valve 15, a brake vent valve 16, a transfer valve 17 conditioned automatically depending upon whether or not a brake application is or is not in effect for rendering the brake vent valve and throttle vent valve alternatively controllable by the wheel slip controller, a brake and sanding control valve 18, a sanding relay valve 19 hereinafter referred to as the sanding valve, two selector valves 20 and 21 of identical construction, two cut-out cocks 22 and 23 of identical construction associated respectively with the forward throttle actuator 12 and the reverse throttle actuator 13, and two one-way or check valves 24 and 25, in parallel relation to the cut-out cocks 22 and 23, respectively.

Also shown in the drawings is a fluid pressure brake system including a brake cylinder 26 for applying or releasing the brakes on one or more pairs of driver wheels (not shown) of the locomotive according to the pressure of fluid established therein, and apparatus under the control of the operator or engineer of the locomotive for controlling the supply of fluid under pressure to and the release of fluid under pressure from the brake cylinder, the latter apparatus being exemplified by a self-lapping brake valve 27 and a normally uncharged control pipe 28 the pressure in which is controlled by the brake valve to determine the degree of application of the brakes desired on the locomotive or train. The source of fluid pressure supply both for pneumatic throttle control and brake control purposes is shown as a reservoir 29 from which fluid under pressure is supplied through a feed valve device 30 to a so-called supply pipe 31.

Various other devices are also included in the equipment and will be described as the description of the equipment progresses.

Considering the parts of the equipment in greater detail, only a plan view of the controller 11 is shown in Figure 1 for the purpose of identifying the different positions of the controller handle 11a in the Z-slot 32. As will be seen by the legends in the drawing, the controller handle 11a is at the right-hand end of the transverse portion of the Z-slot in what is designated "Forward Turbine Engaged" position. In this position, the controller handle is in alignment with one longitudinally extending portion of the Z-slot which constitutes the forward throttle control zone. When the controller handle 11a is shifted a certain initial amount away from the Forward Turbine Engaged position in the forward throttle zone it reaches a so-called "Forward Throttle Closed" position. The outer extremity of the forward throttle zone is designated "Forward Full Throttle" position.

Similarly the left-hand end of the transverse portion of the Z-slot is designated "Reverse Turbine Engaged" position and movement of the controller handle in the longitudinal portion of the Z-slot in alignment with this position is in the reverse throttle zone. A "Reverse Throttle Closed" position and "Reverse Full Throttle" position, corresponding in location to the Forward Throttle Closed and Forward Full Throttle positions, are provided in the reverse throttle zone.

The various functions performed by the throttle control apparatus in the different positions of the controller handle will be explained in greater detail as the description progresses.

The two throttle actuators 12 and 13 are identical in construction and operation. Since reference may be had to the copending application, Serial No. 550,691 to Harry C. May mentioned above for details of construction, these actuators are shown in outline form with only a portion in section. Briefly, each of the actuators 12 and 13 comprises a piston portion 34 and a self-lapping control valve portion 35 for controlling the supply of fluid under pressure to and the release of fluid under pressure from a pressure chamber 34a at one side of a piston 34b in the piston portion 34 in accordance with the pressure of fluid supplied to the control valve portion 35. The piston 34b has a stem 36 which operates slidably in a packing seal, a release spring 36a being provided for yieldingly resisting the movement of the piston 34b in response to the pressure of fluid supplied to the pressure chamber 34a and for yieldingly urging the piston back toward a normal or inner position in which it is shown.

A lever 37, pivoted at one end on a bracket 38 attached to the casing of valve portion 35 and having a clevis at the opposite end engaging in an annular groove on the piston stem 36, causes a lapping operation of the self-lapping valve mechanism of the valve portion 35 when the piston 34b and its stem 36 move outwardly in the left-hand direction an amount corresponding to the degree of pressure supplied to the pressure chamber 34a.

The piston stem 36 of each of the actuators 12 and 13 is suitably connected in manner not shown to a throttle valve for controlling the supply of steam to the forward direction turbine and the reverse direction turbine respectively in accordance with the degree of outward movement of the stem 36 which, in turn, corresponds to the degree of pressure supplied to the control valve portion 35 of the actuator. In actual practice, each throttle valve may comprise a series of progressively operated valves.

Fluid under pressure is supplied selectively to the throttle actuators 12 and 13 under the control of the controller 11, depending upon the position of the controller handle 11a. Thus, in the Forward Turbine Engaged position of the controller handle 11a, in which it is shown, the controller 11 is operative to supply fluid under pressure to a pipe 39, hereinafter designated the forward throttle pipe at a pressure between six and eight pounds per square inch, which as will be hereinafter described in greater detail will be supplied directly or indirectly to a pipe 40 connected to the forward throttle actuator 12, depending upon the position of the cut-out cock 22 to a pipe 40 connected to the forward throttle actuator 12. Fluid under pressure from the pipe 40 is conducted to the control valve portion 35 of the actuator 12 but no actual operation occurs in response to such pressure.

At the same time, the controller 11 is operative to supply fluid at the pressure in the supply pipe 31 to a pipe 41 which acts on the valve element of the double check valve 42 to establish communication between the pipe 41 and a pipe 43 leading to the forward throttle actuator 12. Fluid under pressure from the pipe 43 is supplied to the chamber on the spring side of the piston in the piston portion 34 of the actuator and also to a release insuring valve device, not shown, which is operative to insure the venting of fluid under pressure from the pressure chamber 34a associated with the piston 34b in the piston portion 34. It will thus be seen that in the Forward Turbine Engaged position of the controller handle 11a, the piston 34b of the actuator 12 is positively held in its inner-most position.

When the controller handle 11a is shifted in the forward control zone to the Forward Throttle Closed position, the controller 11 is operative to vent fluid under pressure from the pipe 41, hereinafter designated the forward release pipe, and consequently from the chamber at the spring side of the piston 34b of the actuator 12 as well as from the release insuring valve device. Such venting of fluid under pressure from the chamber at the spring side of the actuator piston 34b as well as from the release insuring valve device conditions the actuator to be actuated in response to the supply of fluid under pressure to the pressure chamber 34a associated with the piston of the actuator. At the same time, the controller is so constituted as to effect an increase of the pressure supplied through the forward throttle pipe 39 to the control valve portion 35 of the actuator 12 to a higher value, such as ten pounds per square inch. The control valve portion 35 of the actuator 12 accordingly operates in response to such pressure of ten pounds per square inch to cause fluid under pressure to be supplied from a supply pipe 44 to the pressure chamber 34a of the actuator piston. The supply pipe 44 is connected by a branch pipe 45 to the supply pipe 31. The actuator piston 34b moves outwardly a certain amount corresponding to the pressure of fluid supplied to the control valve portion 35. Such amount of movement of the piston stem 36 is effective to operate the throttle valve controlling the supply of steam to the forward direction turbine in a manner to supply steam insufficient in amount to operate the turbine but sufficient to effect a warming up of the turbine.

As the controller handle 11a is shifted out of the Forward Throttle Close position progressively toward the Forward Full Throttle position, the controller 11 is operative to supply fluid at a correspondingly increased pressure to the forward throttle pipe 39 and thus to the control valve portion 35 of the forward throttle actuator 12. The piston 34b of the actuator 12 is thus moved outwardly to shift the piston stem 36 in the left-hand direction, as seen in the drawing, an increased amount in correspondence with the pressure of the fluid delivered to the control valve portion 35. When the controller handle 11a reaches the Forward Full Throttle position, the controller 11 is operative to supply the maximum fluid pressure to the forward throttle pipe 39 and thus to the control valve portion 35 of the actuator 12. Accordingly, the actuator piston stem 36 is actuated a maximum amount in the left-hand direction out of its innermost position to effect full throttle valve opening and a consequent supply of the maximum amount of steam to the forward direction turbine to effect the maximum power thereof.

When the controller handle 11a is returned from the Forward Full Throttle position to the Forward Throttle Closed position the pressure of the fluid supplied to the forward throttle pipe 39 and thus to the control valve portion 35 of actuator 12 is progressively reduced in correspondence with the return movement of the controller handle. Restoration of the controller handle 11a to the Forward Turbine Engaged position causes restoration of the supply of fluid under pressure to the forward release pipe 41 and the consequent supply of fluid under pressure to the chamber at the spring side of the actuator piston 34b and to the release insuring valve device which effects an independent release of fluid under pressure from the pressure chamber 34a of the actuator piston.

When it is desired to operate the locomotive in reverse direction, the controller handle 11a is shifted transversely in a left-hand direction through the transverse portion of the Z-slot 32 to approximately the mid-point thereof. Suitable mechanism, not shown, is provided for preventing further movement of the controller handle unless the driver wheels of the locomotive are completely stopped. Assuming that the driver wheels are completely stopped, the controller handle 11a can then be shifted further in the left-hand direction to the Reverse Turbine Engaged position.

In this position of the controller handle 11a, the controller 11 is operative to cause engagement of the clutch device, not shown, for connecting the reverse direction turbine to drive the driver wheels.

While the controller handle 11a is still in the Reverse Turbine Engaged position, the controller 11 is also operative to cause fluid under pressure to be supplied to a so-called reverse throttle pipe 46 at a pressure between 6 and 8 pounds per square inch, such fluid under pressure being supplied, directly or indirectly, under the control of the cut-out cock 23 in the manner hereinafter more fully explained, to a pipe 47 connected to the reverse throttle actuator 13. The pipe 47 corresponds in function to the pipe 40 of the forward throttle actuator 12 in that fluid under pressure is delivered therefrom to the control valve portion 35 of the reverse throttle actuator 13 to effect operation of the actuator piston 34b in a manner similar to that previously described for a forward throttle actuator 12. As in the case of the forward throttle actuator, the pressure of six to eight pounds per square inch supplied to the control valve portion 35 of the reverse throttle actuator 13 is ineffective to cause operation of the actuator piston.

At the same time, while the controller handle 11a is in the Reverse Turbine Engaged position, the controller 11 is operative to supply fluid under pressure from the supply pipe 31 to a so-called reverse release pipe 48, the pressure in which is effective to shift the valve element of the double check valve 49 to cause flow of fluid under pressure from the pipe 48 to a pipe 50 leading to and connected to the reverse throttle actuator 13. The pipe 50 corresponds to the pipe 43 for the forward throttle actuator 12 and functions to deliver fluid under pressure to the chamber at the spring side of the actuator piston 34b and to the release insuring valve device of the actuator 13 in a manner similar to that described when fluid under pressure is supplied to the pipe 43 for the forward throttle actuator 12.

In this connection, it should be understood that the supply of fluid under pressure to the reverse release pipe 48 is maintained while the controller handle 11a is in the Forward Throttle Control zone, thereby insuring against the operation of the reverse throttle actuator at such time. Conversely, it should be understood that the supply of fluid under pressure to the forward release pipe 41 is maintained for insuring against operation of the forward throttle actuator 12 while the controller handle 11a is operated in the reverse throttle control zone.

When the controller handle 11a is shifted out of the Reverse Turbine Engaged position into the Reverse Throttle Closed position, fluid under pressure is vented from the reverse release pipe 48 to effect the corresponding conditioning of the reverse throttle actuator 13 in response to the supply of a substantially higher pressure of approximately ten pounds per square inch simultaneously effected to the reverse throttle pipe 46. As in the case of the Forward Throttle Closed position, the supply of fluid under pressure to the reverse throttle actuator control valve portion 35 while the controller handle 11a is in its Reverse Throttle Closed position is effective to cause fluid under pressure to be supplied at a corresponding pressure to the pressure chamber 34a of the actuator piston. The stem 36 of the piston 34b of reverse throttle actuator 13 is accordingly shifted a certain amount in the left-hand direction to effect the supply of steam to the reverse direction turbine insufficient in amount to effect operation thereof but sufficient to effect warming up thereof.

When the controller handle 11a is shifted progressively from the Reverse Throttle Closed position towards the Reverse Full Throttle position, the controller 11 is operative to supply a progressively increasing pressure to the reverse throttle pipe 46 and thus to the control valve portion 35 of the reverse throttle actuator 13, the maximum fluid pressure being supplied when the controller handle reaches the Reverse Full Throttle position. The piston 34b of actuator 13 is thus correspondingly shifted an increasing amount in the left-hand direction, in correspondence with the degree of pressure supplied to the control valve portion 35 of the actuator, to effect a correspondingly greater amount of supply of steam to the reverse direction turbine.

Upon the restoration of the controller handle 11a from the Reverse Full Throttle position through the Reverse Throttle Closed position to the Reverse Turbine Engaged position, the pressure of fluid delivered through the reverse throttle pipe 46 to the control valve portion 35 of reverse throttle actuator 13 is progressively reduced to effect a corresponding inward or return movement of the actuator piston 34b.

The wheel slip controller 14 is shown in Figure 2 of the drawings in outline form only since reference may be had to the copending application, now Patent 2,447,710, of Joseph C. McCune and George K. Newell, the latter being the present applicant, filed April 29, 1944 and assigned to the assignee of the present application. Briefly, however, it comprises a suitable casing 51 having a plurality of attaching brackets 52 whereby the casing may be attached to a suitable portion of the locomotive structure. Rotatably mounted on a rotary spindle journaled in the casing 51, is a fly-wheel which is driven in response to rotation of the spindle through a yielding connection which permits a rotary movement of the fly-wheel relative to the spindle in either a leading or a lagging direction substantially proportionally to the rate of deceleration and acceleration of the spindle. Whenever the rate of deceleration or acceleration of a wheel exceeds a certain value attained only when the wheel is slipping or spinning for example a rate of deceleration or acceleration which is the equivalent of ten miles per hour per second, the leading or lagging rotary movement of the fly-wheel with respect to the spindle is transmitted to effect operation of a so-called pilot valve device 53 contained within a removable end plate 54.

The spindle for driving the fly-wheel may be connected in any suitable manner for rotation in accordance with the rotation of a pair of driver wheels, as through a flexible shaft having a roller on the end thereof which engages the tread of the driver wheels in frictional contact. As will be explained more fully hereinafter, the pilot valve device 53 of the wheel slip controller 14 is effective when operated in response to the predetermined rate of deceleration or acceleration of the driver wheels to effect venting to atmosphere from a pipe 55, hereinafter designated the pilot valve pipe.

While I have disclosed a wheel slip controller of the type just described for detecting the slipping or spinning condition, it should be understood that any other type of apparatus for detecting a wheel slip may be employed.

The throttle vent valve 15 is adapted to be operated in the manner more fully explained hereinafter under the control of the wheel slip controller 14 to effect a throttle closing operation of both the forward throttle actuator 12 and the reverse throttle actuator 13, whenever spinning of the locomotive driver wheels occurs, for the purpose of terminating the spinning condition automatically. Such control of the actuators 12 and 13 by the throttle vent valve 15 may be cut-out of operation, if desired, by means of the cut-out cocks 22 and 23 in the manner more fully to be described hereinafter.

Before proceeding to a description of the manner in which the throttle vent valve causes a throttle closing operation of the actuators 12 and 13 it will be necessary first to describe in detail the construction and operation of the throttle vent valve 15 itself. The throttle vent valve 15 comprises a sectionalized casing having a body section 56 and a cap section 57. Contained in the body section 56 is a piston valve device 58 comprising an annular piston 59 having a tubular stem 60 on which are formed at spaced intervals thereon a plurality of pistons 61, 62 and 63, the piston 63 forming the closed end of the stem 60 on the opposite extremity from the piston 59.

The piston 59 operates in a suitable bushing 64 suitably fixed in a bore formed in the casing and the pistons 61, 62 and 63 operate in a bushing 65 suitably secured in a counterbore formed in the casing. A spring 66 interposed between the cap section 57 and the closed end of the tubular stem 60 urges the piston 63 downwardly to the normal position in which it is shown. In such position, a gasket secured in the outer face of the piston 63 seats on an annular rib seat 67 to close an exhaust port 68.

The bushing 65 is provided with four series of circumferentially arranged ports 69, 70, 71 and 72 respectively spaced longitudinally therealong at substantially equal intervals which ports open into annular chambers 73, 74, 75 and 76 respectively, surrounding the bushing 65.

In the normal position of the piston valve device 58 in which it is shown in Figure 2, an annular cavity 77 formed between the pistons 62 and 63 connects the two series of ports 71 and 72, thereby connecting the two annular chambers 75 and 76.

In a similar manner, an annular cavity 78 formed between pistons 61 and 62 connects the two series of ports 69 and 70, thereby connecting the two annular chambers 73 and 74.

Chamber 73 is constantly connected to atmosphere through an exhaust port 79. The chamber 74 is connected by a passage and pipe 80 to the selector valve 21. The chamber 75 is connected by a passage and pipe 81 to the delivery port of a double check valve 82, fluid under pressure being supplied to the two input ports at opposite ends of check valve 82 alternatively from the forward throttle pipe 39 and from the reverse throttle pipe 46 under the control of the cut-out cocks 22 and 23 respectively, in a manner more fully described hereinafter. The chamber 76 is connected by a passage and pipe 83 to the selector valve 20.

Chamber 76 is also connected by a passage 84 to the inner seated area of a poppet type valve 85, hereinafter designated the pressure reduction valve. A spring 86 interposed between the valve 85 and the upper contact face of the body casing section 56 tends to unseat the valve 85 upwardly from a valve seat formed in the cap section 57. A diaphragm 87, clamped along the periphery thereof by a screw plug 88, forms a closed chamber 89 surrounding the valve 85. A cup-shaped or piston type follower 91, slidably operable in a bore formed in the screw plug 88 and biased downwardly by a spring 92 into engagement with the upper face of the diaphragm 87, causes the lower face of the diaphragm to engage the valve 85 to hold it normally in seated position in opposition to the spring 86.

The passage 81 opening out of the chamber 75 is connected by a branch passage 93, in which a choke fitting 94 is interposed, to a cavity 95 in the cap section 57 which opens into the piston chamber 96 above the annular piston 59. A branch passage 97 connects the passage 93 to the annular chamber 98 formed at the underside of the annular piston 59 and between the piston 59 and the piston 61.

The piston chamber 96 is connected through the cavity 95 and a pipe 99 to the transfer valve 17 which, as will hereinafter be explained, serves to connect the pipe 99 to the pilot valve pipe 55 leading to the wheel slip controller 14 while the brakes on the locomotive are released in response to the absence of pressure in the brake control pipe 28.

Also formed in the cap section 57 is a bore 100, at the lower end of which is formed a valve seat surrounding a port opening into the piston chamber 96, on which seat a valve 101 of the poppet type is resiliently seated by a coil spring 102 interposed between the upper face of the valve and a screw plug 102a closing the open end of the bore 100. The valve 101 also has a stem 103, including a fluted portion immediately adjacent thereto, which stem 103 extends downwardly through the piston chamber 96 in coaxial relation within the tubular stem 60 of the piston valve device 58 and terminates at a point having a predetermined spaced relation to a projecting lug or pin 104 formed on the inner face of the piston 63. When the piston 59 is shifted upwardly, in the manner hereinafter to be described, the pin 104 engages the end of the stem 103 of the valve 101 to effect unseating of the valve.

The chamber 89 at the lower side of the diaphragm 87 is connected by a passage 105 to the bore 100 above the valve 101.

By way of preliminary description of the operation of the throttle vent valve 15, let it be supposed that fluid under pressure is supplied to the pipe 81 in response to the supply of fluid under pressure to the forward throttle pipe 39 or the reverse throttle pipe 46 under the control of the controller 11. By reason of the connection between the annular chambers 75 and 76 by cavity 77, fluid under pressure is supplied to the pipe 83 and through the passage 84 to the inner seated area of the pressure reduction valve 85. At the same time, fluid under pressure flows through the branch passages 93 and 97 to the annular chamber 98 on the underside of the piston 59 while also flowing at a somewhat restricted rate through the choke-fitting 94 and cavity 95 to the piston chamber 96. The spring 66 is of such strength as to maintain the piston valve device 58 in the position in which it is shown in Figure 2, by reason of the fact that insufficient differential pressure is created on the piston 59 to effect upward movement of the piston 59 in opposition to the spring 66.

Fluid under pressure is also supplied by way of the pipe 99 and transfer valve 17 to the pilot valve pipe 55 which is correspondingly charged to the pressure established in piston chamber 96. When the pressure of the fluid supplied to the inner seated area of the pressure reduction valve 85 exceeds a certain pressure, of the order of eighteen pounds per square inch, the force of the spring 92 is overcome and the valve is shifted slightly from its seat, whereupon the pressure of the fluid supplied to the chamber 89 on the underside of the diaphragm 87 is effective to urge the follower 91 positively upward to its uppermost position enabling the spring 86 to unseat the valve 85 to its fullest extent. The pressure of the fluid in the chamber 89 is also effective through the passage 105 and bore 100 on the valve 101 to assist the spring 102 in maintaining the valve seated in opposition to the pressure active on the inner seated area thereof in the piston chamber 96.

By reason of the connection of the piston chamber 96 to the pilot valve pipe 55 controlled by wheel slip controller 14 it will be seen that unseating of the pilot valve device 53 in response to the occurrence of a spinning condition of the driver wheels of the locomotive will effect instantaneous venting of fluid under pressure from the piston chamber 96 at a rapid rate. Due to the restriction offered by the choke-fitting 94 to the supply of fluid under pressure from the passage 93 to the piston chamber 96, the pressure in the chamber 96 will reduce at a much faster rate than the pressure in the chamber 98 on the underside of the piston 59. Consequently a sufficient differential force will be promptly created on the piston 59 effective to shift it upwardly to its uppermost position engaging the contact face of the cap section 57 open to the chamber 96.

In such position of the piston valve device 58, the piston 63 is shifted to a point above the ports 72, thereby connecting the pipe 83 and the passage 84 to atmosphere by way of the exhaust port 68.

By reason of the fact that the valve 85 is unseated as well as the valve 101 at this time, it will be seen that the pressure of the fluid in the chamber 96 will thereafter be reduced at a rapid rate past the valve 101, through the passage 105 and chamber 89, past the valve 85, through the passage 84, chamber 76, ports 72, and the exhaust port 68 until such time as the pressure of the fluid active in the chamber 89 on the lower face of the diaphragm 87 reduces to a value of approximately eighteen pounds per square inch, at which time the spring 92 becomes effective to reseat the valve 85 and cut off the further exhaust of fluid under pressure from the chamber 96 therepast.

Assuming that the pilot valve device 53 of the wheel slip controller 14 is closed in response to the termination of the spinning condition of the driver wheels of the locomotive prior to the reseating of the valve 85, it will be seen that the chamber 96 will be promptly recharged by fluid under pressure supplied from the pipe and passage 81 through passage 93, the choke 94, and cavity 95. Due to the slight time interval required to build up a sufficient pressure in the chamber 96 to cause movement of the piston valve device 58 downwardly to its normal position in which it is shown in the drawing, the pressure in the pipe 83 will reduce further to a lower pressure, such as five pounds per square inch, before the piston 63 of the piston valve device 58 reseats on the annular rib seat 68 to cut off further exhaust of fluid under pressure from the pipe 83.

The brake vent valve 16 is of the type described in detail and claimed in Patent 2,366,044 of Joseph C. McCune assigned to the assignee of the present application. It is deemed unnecessary therefore to show the details of brake vent valve 16 in the drawing or to describe it in detail. Essentially, however, the brake vent valve 16 is quite similar in construction and operation to the throttle vent valve 15, just previously described. It comprises a piston valve device, similar to the piston valve device 58 of the throttle vent valve 15, and a piston chamber corresponding to the piston chamber 96 of throttle vent valve 15, which is connected by a pipe 107 to the transfer valve 17, the transfer valve being adapted to connect the pipe 107 to the pilot valve pipe 55 in the manner presently to be described.

In the normal position of the piston valve device of the brake vent valve 16, the piston valve device establishes communication between a branch pipe 108 of the control pipe 28 and a pipe 109 leading to one side of a double check valve 110, the delivery port of which is connected by a pipe 111 to the pressure chamber of the brake cylinder 26. With the control pipe 28 charged with fluid at a pressure determined by operation of the brake valve 27 in the manner hereinafter described, fluid under pressure is thus delivered to the brake cylinder 26 to effect application of the brakes on the driver wheels of the locomotive.

Whenever the pressure in the piston chamber of the piston valve device of the brake vent valve 16 is rapidly reduced by operation of the pilot valve device 53 of the wheel slip controller 14 under circumstances later to be described, the piston valve device is operated to cut off the supply of fluid under pressure from the pipe 108 to the pipe 109 and the brake cylinder 26 and, at the same time, establish an exhaust communication through which fluid under pressure is exhausted at a rapid rate from the brake cylinder by way of pipe 109 to atmosphere.

The brake vent valve 16 includes a pressure reduction valve, corresponding to the valve 85 of the throttle vent valve 15, which is effective to terminate the reduction of the pressure in the piston chamber of the piston valve device by way of the same exhaust communication that exhausts the pressure from the brake cylinder, whenever the pressure in the brake cylinder reduces to approximately eighteen pounds per square inch.

Assuming that the pilot valve device 53 of the wheel slip controller 14 is closed, reclosure of the pressure reduction valve of the brake vent valve 16 causes prompt restoration of the piston valve device of the brake vent valve to its normal position, wherein further reduction of the pressure in the brake cylinder 26 is terminated and the supply communication between the pipes 108 and 109 again reestablished to effect reapplication of the brakes. Actually, due to the time required for the piston chamber of the piston valve device of the brake vent valve 16 to recharge by fluid supplied from the supply pipe 108, the pressure in the brake cylinder 26 will reduce to approximately five pounds per square inch before the supply communication to the brake cylinder is again established.

As previously indicated, the transfer valve 17 is operative to selectively establish the connection of the pilot valve pipe 55 to either the pipe 99 leading to the throttle vent valve 15 or to the pipe 107 leading to the brake vent valve 16. The transfer valve 17 comprises a suitable casing 112 generally cylindrical in form, open at both ends, and closed by end plates 113 and 114 removably attached thereto. Operative in suitable bores provided in the casing 112 is a piston assembly comprising three coaxially related pistons 115, 116 and 117. The two pistons 116 and 117 are of the same diameter and operate in corresponding bores 118 and 119 respectively. The piston 115 is larger in diameter than the pistons 116 and 117 and operates in a corresponding bore 120.

The two pistons 115 and 116 are preferably integrally formed with a connecting stem 121 therebetween and a stem 122 extending to one side of the piston 116 to the end of which the piston 117 is removably secured as by a nut engaging a screw-threaded end portion of the stem 122. The chamber formed between the pistons 115 and 116 is constantly open to atmosphere through a port 123.

Contained in the chamber formed between the two pistons 116 and 117, hereinafter designated the slide valve chamber 124, is a slide valve 125 which operates slidably on a slide valve seat 126 formed on the casing 112 between the two bores 118 and 119. The slide valve 125 is locked in a recess 127 formed in the piston stem 122 so as to be shifted in either direction in response to the movement of the piston assembly.

The slide valve 125 is pressed in sealing contact with a slide valve seat 126 in any suitable manner, as for example by supplying fluid at a relatively high pressure from the supply pipe 31 through a branch pipe 128 to the slide valve chamber 124. In such case, by reason of the equivalent areas of the pistons 116 and 117, the fluid pressure forces on the pistons are balanced and the pressure of the fluid in the slide valve chamber 124 in no way interferes with the movement of the piston assembly.

The piston assembly is normally yieldingly urged in the left-hand direction to a normal position, in which it is shown in the drawing, wherein an annular rib formed on the outer face of the piston 115 seats in sealing contact on an annular gasket on the inner face of the end plate 113 by means of a coil spring 129 interposed between the outer face of the piston 117 and the inner face of the end plate 114.

The chamber 130 on the outer face of the piston 115 within the sealing rib of the piston is constantly connected by a branch pipe 131 to the control pipe 28. So long as the control pipe 28 is uncharged as it is while the brakes are released, the piston assembly remains in the position in which it is shown. In this position of the piston assembly, a cavity 132 in the slide valve 125 establishes a connection between two ports 99a and 55a in the slide valve seat 126, and thus between the pipes 99 and 55 respectively connected to the ports. Thus, so long as the control pipe 28 is uncharged, as it is while the brakes are released, the transfer valve 17 connects the pipe 99 from the throttle vent valve 15 to the pilot valve pipe 55 leading to the wheel slip controller 14, thereby rendering the throttle vent valve subject to the control of the wheel slip controller.

When the control pipe 28 is charged, as it is to initiate a brake application, the fluid at a corresponding pressure active in chamber 130 on the outer face of the piston 115 exerts a force urging the piston assembly in the right-hand direction. When the pressure of the fluid in the chamber 130 exceeds a certain value, such as ten or fifteen pounds per square inch, the force on the piston 115 is sufficient to overcome spring 129 and effect unseating of the piston 115 from the annular gasket in the end plate 113. The fluid under pressure in the chamber 130 is thus suddenly active over the entire outer face of the piston in contrast to the smaller inner-seated area of the piston. This results in a sudden increase in the total force exerted by the fluid pressure in chamber 130 on the outer face of the piston 115 and causes the piston assembly to be shifted, by snap-action in the right-hand direction to a position determined by the engagement of the end of the stem 122 with a boss 133 on the inner face of the end plate 114. Dashpot action of the piston 117 is prevented by providing an atmospheric port 134 in the end plate 114.

In the right-hand position of the piston assembly just described, the cavity 132 in the slide valve is in such a position that the communication between the ports 55a and 99a is closed or cut off while the port 55a is connected by the cavity 132 to a port 107a in the slide valve seat to which the pipe 107 from the brake vent valve 16 is connected. The slide valve 125 is thus positioned to connect the pilot valve pipe 55 to the pipe 107 and the connected piston chamber of the brake vent valve 16, thereby enabling operation of the brake vent valve under the control of the wheel slip controller 14.

The selector valves 20 and 21 are provided for automatically rendering the throttle vent valve 15 operative to control either the forward throttle actuator 12 or the reverse throttle actuator 13, dependent upon the operation of the controller handle 11a in the forward throttle control zone or the reverse throttle control zone.

Both of the selector valves 20 and 21 are identical in construction and a description of one will suffice for both. Each selector valve comprises a suitable casing 136 generally cylindrical in form and having the two open ends thereof closed by end plates 137 and 138 respectively, which are removably attachable to the casing 136 as by screws or bolts not shown.

Contained in the casing 136 is a piston assembly comprising two pistons 139 and 140 of equal area, the pistons operating in coaxial bores 141 and 142 respectively located at opposite ends of the casing 136. The two pistons are connected by a stem 143 with which one of the pistons, such as the piston 139, is integrally formed, the other piston 140 being suitably secured to the end of the stem 143 opposite the piston 139, as by a screw-threaded connection, in the manner shown in Figure 1.

Formed on the casing 136 between the pistons 139 and 140 is an annular shoulder 144 having a central bore 145 therethrough through which the piston stem 143 extends. It will be understood, therefore, that for purposes of assembly, it is necessary that one of the pistons be removable from the stem 143.

Secured to each of the opposite faces of the angular shoulder 144 in concentric relation to the stem 143 is an annular gasket 146. The pistons 139 and 140 are severally provided with an annular rib 147 adapted to seat alternatively on the corresponding gasket 146 in sealing contact, depending upon the direction in which the piston assembly is shifted, it being understood that the piston stem 143 is of such length that when one of the pistons is seated on the corresponding gasket seat 146 the other piston is unseated therefrom, and vice versa.

Fluid under pressure may be supplied alternatively to the piston chambers 148 and 149, formed at the outer face of the pistons 139 and 140 of both selector valves 20 and 21, respectively, through pipes 150 and 151 under circumstances hereinafter more fully described. As shown, the chambers 148 of selector valves 20 and 21 are connected to pipe 150 by branch pipes 150a and 150b, respectively. Similarly, the chambers 149 of selector valves 20 and 21 are connected to pipe 151 by branch pipes 151a and 151b, respectively.

Selector valve 20 is provided with a port or passage 83a, open to the bore 145 in the annular shoulder 144, to which the pipe 83 leading from the throttle vent valve 15 is connected. Selector valve 21 is provided with a similar port or passage 80a, to which the pipe 80 leading from throttle vent valve 15 is connected.

Opening into the bores 141 and 142 at a point between each of the pistons 139 or 140 and the annular shoulder 144 are ports 152 and 153, respectively. Connected to the port 152 of selector valve 20 is a pipe 154 leading to the cut-out cock 22. Connected to the port 153 of selector valve 20 is a pipe 155 leading to the cutout cock 23.

The port 152 of the selector valve 21 is connected by a pipe 156 to the end of the double check valve 42 opposite to that to which the forward release pipe 41 is connected. The port 153 of the selector valve 21 is connected by a pipe 157 to the end of the double check valve 49 opposite to that to which the reverse release pipe 48 is connected.

The pipe 151a, connected to the piston chamber 149 of the selector valve 20, is also connected to one end of the double check valve 82. The pipe 150a is connected by a branch pipe 158 to the opposite end of the double check valve 82.

The cut-out cocks 22 and 23 are identical in construction, each having a casing in which a tapered bore is formed for receiving a tapered valve element 159 of the plug type. Sealing contact of the valve element 159 in the valve bore is maintained by coil spring 160 interposed between the wide end of the valve element and a screw plug 161 that closes the open end of the bore through which the valve element is inserted. An operating handle 162, fixed to the exteriorly projecting narrow end of the valve element is provided for turning the valve element into either of two positions in substantial quadrature relation to each other.

Each valve element 159 contains two through ports 163 and 164 that extend in substantially spaced parallel relation diametrically through the valve element. Each valve element 159 is also provided with a third port 165 extending at right angles to the ports 163 and 164 diametrically through the valve element.

A plurality of ports and passages opening into the tapered valve bore for cooperative registration with the ports 163, 164 and 165 are provided, which passages lead to corresponding ports opening at the exterior of the casing, to which the pipes 39, 40, 154 and 151 are respectively connected in the case of the cut-out cock 22, and to which the pipes 46, 47, 150 and 155 are respectively connected in the case of the cut-out cock 23.

With the handle 162 of the cut-out cock 22 in the position shown in Figure 1, port 163 establishes communication between the pipe 39 and the pipe 151 and the port 154 establishes communication between the pipe 154 and the pipe 40.

When the handle 162 of the cut-out cock 22 is turned substantially 90 degrees out of the position in which it is shown, the connections established by the ports 163 and 164 are cut off and the port 165 establishes a direct communication between the pipes 39 and 40.

Similarly, with the handle 162 of the cut-out cock 23 in the position in which it is shown in Figure 1, the port 163 connects pipe 46 to the pipe 150 and the port 164 connects the pipe 155 to the pipe 47.

When the handle 162 of the cut-out cock 23 is turned substantially 90 degrees out of the position in which it is shown, the connections established by the ports 163 and 164 are cut off and the port 165 establishes a direct communication from the pipe 46 to the pipe 47.

The cut-out cocks 22 and 23 are normally conditioned as shown in Figure 1 and are operated to positions in quadrature to that shown in Figure 1 only when it is desired to cut the throttle vent valve 15 out of operation and render it ineffective to control the operation of the forward throttle actuator 12 and the reverse throttle actuator 13 respectively.

The one-way or check valve 24 is connected in by-passing relation to the cut-out cock 22 in such a manner as to prevent the flow of fluid under pressure therethrough from the pipe 39 to the pipe 40 while permitting rapid reverse flow of fluid therethrough from the pipe 40 to the pipe 39.

Similarly, the one-way or check valve 25 is connected in by-passing relation to the cut-out cock 23 so as to prevent the flow of fluid therethrough from the pipe 46 to pipe 47 while permitting the rapid reverse flow of fluid therethrough from the pipe 47 to the pipe 46.

The brake and sanding control valve 18 comprises a sectionalized casing having a main section 167 and two end sections 168 and 169 removably attached to opposite ends of the section 167. Contained in the casing is a piston assembly comprising three pistons 171, 172 and 173, respectively, each of a different diameter and effective pressure area. Piston 171 is the smallest in area, piston 173 is the largest in area and piston 172 is of intermediate area. The pistons 171, 172 and 173 are preferably integrally formed in coaxial relation to one another in such a manner that the two pistons 171 and 172 are connected by a relatively long stem 174 and the two pistons 172 and 173 are connected by a relatively short stem 175.

The piston 171 operates in a bore 176 formed in the end section 168. The piston 173 operates in a bore 177 formed in the end section 169. The piston 172 operates in a bore 178 formed in the casing section 167 at the end adjacent the end section 169.

A slide valve 179 is contained in the chamber 180 formed between the two pistons 171 and 172 and is so interlocked in a recess 181 of the piston stem 174 as to be shifted slidably on a slide valve seat 182 in response to movement of the piston assembly.

A coil spring 183 interposed between the outer face of the piston 173 and the end casing section 169 yieldingly urges the piston assembly in the left-hand direction to the position in which it is shown, determined by the engagement of the outer face of the piston 171 with a boss 184 formed at the base of the bore 176 on the end casing section 168. A breather port 185 is provided in the end casing section 168 for preventing dashpot action of the piston 171.

A graduating spring cage member 186, yieldingly biased by a coil spring 187 interposed between the member 186 and a screw plug 188, urges the member 186 normally into the chamber 189 formed at the outer face of the piston 173 to a position determined by the engagement of a peripheral flange at one end thereof with a stop shoulder formed on the casing section 169.

Fluid under pressure is supplied to the slide valve chamber 180 for the purpose of shifting the piston assembly in the right-hand direction in opposition to the springs 183 and 187, which pressure also serves to hold the slide valve 179 on its seat 182.

For the purpose of supplying fluid under pressure to the slide valve chamber 180 the wall of the casing section 167 is provided with a port to which a pipe 190 leading from the delivery port of a double check valve 191 is connected. One end of the double check valve 191 is connected by a pipe 192 to the control pipe 28. The opposite end of the double check valve 191 is connected by a pipe 193 to the delivery port of a double check valve 194. Pipe 151 leading from the cut-out cock 22 is connected to one end of the double check valve 194. Pipe 150 leading from the cut-out cock 23 is connected to the opposite end of the double check valve 194.

The valve element of the double check valve 194 is shiftable in response to the supply of fluid under pressure to the pipe 150 or 151 to a position wherein fluid under pressure is supplied from the pipe 150 or the pipe 151 to the pipe 193.

The valve element of the double check valve 191 is shiftable in response to the pressure of fluid supplied to pipe 193 to a position in which fluid under pressure flows from the pipe 193 to the pipe 190 and the slide valve chamber 180 of the brake and sanding control valve 18. When fluid under pressure is supplied from the control pipe 28 through the pipe 192 to the other end of the double check valve 191, the valve element thereof is shifted to cut off the connection between the pipe 193 and the pipe 190 and establish a connection through which fluid under pressure flows from the pipe 192 to the pipe 190 and the connected slide valve chamber 180.

Chamber 189 at the outer face of the piston 173 is connected by a branch pipe 55b to the pilot valve pipe 55 and is correspondingly charged with fluid under pressure whenever the pilot valve pipe 55 is charged.

The slide valve 179 is provided with a through port 195, and a cavity 196 having a port 197 connected thereto. Opening at the slide valve seat 182 are three ports 198, 199, and 200, the latter being an atmospheric exhaust port.

The port 198 is connected by a pipe 201, in which a manually operated normally open valve or cut-out cock 202 is interposed, to one end of a double check valve 203, the opposite end of which is connected to a supply pipe 204 through which fluid under pressure may be supplied under manual control of the engineer or operator of the locomotive. The delivery port of the double check valve 203 is connected by a pipe 205 to the sanding valve 19.

The port 199 is connected by a passage 206 which opens through a choke-fitting 207 into a chamber 208 formed between the two pistons 172 and 173. The chamber 208 is connected by a passage 209 to a port to which a pipe 210 leading to the end of the double check valve 110 opposite that to which the pipe 109 from the brake vent valve 16 is connected. A manually operated normally open valve or cut-out cock 211 is interposed in the pipe 210.

Interposed between passages 206 and 209 is a one-way or check valve 212 of the ball type so arranged as to prevent the supply of fluid under pressure therepast from the passage 206 to the passage 209 and the connected chamber 208 while permitting rapid reverse flow of fluid under pressure therepast from the passage 209 and chamber 208 to the passage 206, as well as flow of fluid under pressure from the pipe 210 and also the brake cylinder 26 when connected to the pipe 210.

As will be explained more fully hereinafter, whenever propulsion of the locomotive is initiated, either in a forward or a reverse direction, by operation of the controller 11, or whenever a brake application is initiated by operation of the brake valve 27, fluid at substantially the same pressure is supplied simultaneously to the slide valve chamber 180 and the piston chamber 189 at the outer face of the piston 173. The force of the fluid pressure on the piston 173 exerted in the left-hand direction is larger than the differential force of the fluid pressure in the slide valve chamber 180 exerted on the two pistons 171 and 172 in a right-hand direction. Consequently, the piston assembly remains stationary in the position in which it is shown unless and until the pressure in the pilot valve pipe 55 and the connected chamber 189 is suddenly and rapidly reduced by operation of the wheel slip controller.

Assuming a rapid reduction of the pressure in piston chamber 189, the differential fluid pressure force exerted on the pistons 171 and 172 to urge the piston assembly in the right-hand direction promptly predominates over the fluid pressure force exerted in the left-hand direction on the piston 173 by the reducing pressure of the fluid in the chamber 189 and, consequently, the piston assembly is moved in a right-hand direction until the piston 173 engages the end of the graduating spring cage 186.

Upon the movement of the piston assembly in the right-hand direction out of the position in which it is shown, the port 198 is first uncovered by the left-hand end of the slide valve 179, thereby causing fluid under pressure to be supplied from the slide valve chamber 180 to the pipe 201 past the valve element of the check valve 203 which is automatically shifted to establish a connection from the pipe 201 to the pipe 205 and thence to the sanding valve 19, which is operated in response to such fluid pressure in the manner hereinafter to be described. A slight interval of time after the port 198 is uncovered, the piston 173 engages the end of the graduating spring cage member 186 and further movement of the piston assembly momentarily stop due to the added resistance of the spring 187. In this position of the slide valve 179, the through port 195 registers with the port 199 and fluid under pressure is accordingly supplied from the slide valve chamber 180 to the passage 206 and thence at a restricted rate through the choke fitting 207 to the chamber 208 and also to the pipe 210. The pressure of the fluid supplied to the pipe 210 acting on the valve element of the double check valve 110 shifts it to a position to establish communication between the pipe 210 and the pipe 111 leading to the brake cylinder 26 so that fluid under pressure is thus applied to the brake cylinder 26.

The choke-fitting 207 is so designed as to limit the build-up of the pressure in the pressure chamber of the brake cylinder 26 to approximately eight pounds per square inch, following which further build-up of pressure in the brake cylinder is cut off as a consequence of further movement of slide valve 179 in the right-hand direction. Such further movement of the slide valve occurs in response to the differential force of the fluid at eight pounds per square inch pressure exerted on the two pistons 172 and 173, which additional force is effective to overcome the resisting force of the graduating spring 187 to cause further movement of the piston assembly in the right-hand direction to an extreme position determined by the engagement of the spring cage member 186 with the inner face of the screw plug 188. In the position to which the slide valve is so moved, the through port 195 is shifted out of registry with the port 199 to cut off the further supply of fluid under pressure to the brake cylinder 26 and chamber 208.

Upon termination of the reduction of the pressure in the pilot valve pipe 55 and correspondingly in the piston chamber 189 of the brake and sanding control valve 18 followed by the prompt recharging of the pilot valve pipe 55 and the chamber 189, springs 183 and 187 act to shift the piston assembly in the left-hand direction rapidly back to the normal position in which it is shown in Figure 2.

The slide valve 179 is correspondingly positioned to cause the ports 198 and 199 to be connected through the port 197 and cavity 196 in the slide valve to the exhaust port 200. Fluid under pressure is thus rapidly vented from the pipe 205 and the connected sanding valve 19 reversely past the double check valve 203, through the pipe 201, port 197, cavity 196 and exhaust port 200. At the same time, fluid under pressure is rapidly vented past the check valve 212 from the chamber 208 and the brake cylinder 26 to the passage 206 and thence to atmosphere through cavity 196 and the exhaust port 200.

As will be explained more fully hereinafter, upon the release of a brake application or upon the operation of the controller handle 11a to either the Forward Throttle Closed or Reverse Throttle Closed positions, fluid under pressure is simultaneously released from the slide valve chamber 180 and the piston chamber 189. Consequently, the piston assembly of the brake and sanding control valve 18 remains in its normal position, in which it is shown, at such time.

The sanding valve 19 is a well known type of pneumatically operated relay valve comprising an operating piston 214 and a pair of oppositely seating valves 215 and 216 of the poppet type. The two valves 215 and 216 are oppositely faced and adapted to engage each other in such a manner that a coil spring 217 active on the end of the fluted stem of the valve 126 is effective to urge the valves 215 and 216 to seated and unseated positions respectively.

In its unseated position, valve 216 establishes communication therepast from a chamber 218, constantly charged with fluid under pressure from the supply pipe 31 through a pipe 219 and an air filter or strainer 220, to a chamber 221 and a sanding reservoir 222 connected to chamber 221 by a pipe and passage 223, thus causing the sanding reservoir 222 to be charged to the pressure in the supply pipe 31.

When fluid under pressure is supplied to the pipe 205 it flows to a chamber 224 at the upper side of the operating piston 214, the force of the fluid pressure exerted on the piston urging it downwardly into seating engagement on an annular gasket seat 225. At the same time, a contact pin 226 carried in the end of the piston stem 227 engages the end of the fluted stem of the valve 215 and shifts the valves 215 and 216 downwardly into unseated and seated positions respectively. A coil spring 228 carried in the stem 227 of the piston 214 permits the contact pin 226 to yield upwardly and at the same time maintain a firm seating engagement of the valve 216 on its corresponding valve seat.

Valve 216 is effective, when seated, to cut off the supply of fluid under pressure to charge the sanding reservoir 222. Valve 215 is effective, when unseated, to establish communication from the chamber 221 and the connected sanding reservoir 222 to a chamber 229 to which conventional sanders or sanding devices (not shown) are connected through a pipe and passage 230.

It will thus be seen that so long as sufficient pressure is maintained in the piston chamber 224 to hold the valves 215 and 216 in their respectively seated and unseated positions, fluid under pressure will be supplied from the sanding reservoir 222 through the pipe 230 to the sanders to effect sanding of the track rails immediately in advance of the driver wheels of the locomotive. If the sanding reservoir pressure blows down completely before the piston 214 is allowed to return upwardly to its normal position, in which it is shown, the sanding operation will of course terminate notwithstanding the existence of fluid pressure in the piston chamber 224. If the pressure in the piston chamber 224 is vented or substantially reduced to an extent sufficient to cause restoration of the valves 215 and 216 upwardly by action of the spring 217 to seated and unseated positions, respectively, before the sanding reservoir pressure blows down completely, the sanding operation will be terminated at such time.

OPERATION

(a) Propulsion

With the cut-out cocks 22 and 23 positioned as shown in Figure 1 wherein the throttle vent valve 15 is effective to control the operation of the forward throttle actuator 12 and the reverse throttle actuator 13, and with the brake valve 27 operated to its brake release position so that the pressure in the control pipe 28 is at atmospheric pressure, let it be assumed that the operator desires to start the locomotive in a forward direction by operation of the controller handle 11a out of its Forward Turbine Engaged position to some position intermediate between the Forward Throttle Closed position and the Forward Full Throttle position.

In such case, therefore, the controller 11 is effective to cause fluid under pressure to be supplied from the supply pipe 31 to the forward throttle pipe 39. With the cut-out cock 22 in the position in which it is shown in Figure 1, the fluid under pressure accordingly flows from the pipe 39 by way of the port 163 in the plug valve element 159 to the pipe 151, from which it is delivered through the branch pipes 151a and 151b to the piston chamber 149 of each of the selector valves 20 and 21. The piston assemblies of the two selector valves 20 and 21 are thus shifted in the left-hand direction from the position in which they are shown to the position in which the annular rib 147 on each piston 140 engages the associated annular gasket 146 in seating engagement.

The pressure of the fluid in the branch pipe 151a acts on the valve element of the double check valve 82 to shift it so as to establish a connection from the pipe 151a to the pipe 81, thereby causing fluid under pressure to be supplied to the throttle vent valve 15. As previously described, with the throttle vent valve conditioned as it is shown in Figure 2 fluid under pressure is correspondingly supplied to the piston chamber 96 and, by way of the pipe 99 and the cavity 132 in the slide valve 125 of the transfer valve 17, to the Decelostat pilot valve pipe 55. It will be understood that with the control pipe 28 uncharged as it is while the brakes are released, the transfer valve 17 is effective to establish the connection between the pipe 99 and the pilot valve pipe 55.

The piston chamber 189 of the brake and sanding control valve is also charged with fluid under pressure from the pilot valve pipe 55 through the branch pipe 55b.

As previously described, the annular cavity 77 between the pistons 62 and 63 of the piston valve device 58 of the throttle vent valve 15 is at the same time effective to connect the pipe 81 to the pipe 83 so that fluid under pressure is thus supplied from the pipe 81 to the pipe 83 thence through port 83a of a selector valve 20 and past the unseated piston 139, through port 152, pipe 154, port 164 in the valve element 159 of the cut-out cock 22, and the pipe 40 to the control valve portion 35 of the forward throttle actuator 12.

With the piston assembly of the selector valve 21 shifted in the left-hand direction to the position in which the piston 140 is in seated engagement with its corresponding gasket seat 146 and the piston 139 is unseated, communication is established between the pipe 156 and the pipe 80. Pipe 80 is connected with the atmospheric exhaust port 79 through the annular cavity 78 between the pistons 61 and 62 of the piston valve device 58 of the throttle vent valve 15. It will thus be seen that no fluid pressure exists in pipe 156 on the valve element of the double check valve 42. Consequently no hindrance is offered to the free movement of the valve element of the double check valve 42 in response to the supply of fluid under pressure to the forward release pipe 41 should the controller handle 11a, for any reason, be restored to the Forward Turbine Engaged position.

The pressure of the fluid supplied to the pipe 151 also acts on the valve element of the double check valve 194 to shift it to a position such that fluid under pressure is supplied therepast from the pipe 151 to the pipe 193. The pressure of the fluid supplied to the pipe 193 acts similarly to shift the valve element of the double check valve 191 to a position in which the fluid under pressure flows therepast from the pipe 193 to the pipe 190 and the connected slide valve chamber 180 of the brake and sanding control valve 18.

It will be understood that the pressure of the fluid in the slide valve chamber 180 is being built up concurrently with the build-up pressure in the piston chamber 189 on the outer face of the piston 173. As previously indicated, therefore, the piston assembly of the brake and sanding control valve 18 remains in the position in which it is shown in Figure 2.

By reason of the supply of fluid under pressure to the control valve portion 35 of the forward throttle actuator 12 in the manner just previously described, the piston 34b and its stem 36 are shifted in the left-hand direction to effect operation of the throttle valve or valves controlling the supply of steam to the forward direction turbine to cause it to turn the driver wheels of the locomotive in a forward direction so that the locomotive is propelled forwardly. Obviously the engineer may shift the controller handle 11a to different positions in the forward throttle zone to provide the desired rate and smoothness of acceleration. After the locomotive has been accelerated to a desired speed, the engineer may also adjust the position of the controller handle 11a in the forward throttle zone to cause desired operation of the throttle valve or valves to vary the speed of the locomotive.

Now let it be assumed that when the engineer operates the controller handle 11a beyond the Forward Throttle Closed position toward the Forward Full Throttle position, the propulsion torque exerted on the driver wheels of the locomotive is such as to exceed the adhesion between the driver wheels and the track rails, thereby causing spinning of the driver wheels. In such case, therefore, the pilot valve device 53 is operated instantly to effect a rapid reduction of the pressure in the pilot valve pipe 55, thereby effecting a correspondingly rapid reduction of the pressure in the piston chamber 96 of the throttle vent valve 15 and in the piston chamber 189 of the brake and sanding control valve 18.

The piston valve device 58 of the throttle vent valve 15 is accordingly operated in the manner previously described to cause venting of fluid under pressure from the pipe 83 at a rapid rate through the exhaust port 68 and at the same time to establish communication, through the annular cavity 77, between the pipe 81 and pipe 80. Fluid under pressure is accordingly rapidly vented from the control valve portion 35 of the forward throttle actuator 12 by flow through the pipe 40, port 164 of the cut-out cock 22, pipe 154, through the selector valve 20 to the pipe 83, and thence to atmosphere through the exhaust port 68. At the same time, the fluid under pressure is supplied from the pipe 81 to the pipe 80, and thence through the selector valve 21 to the pipe 156 where the pressure of the fluid is effective on the valve element of the double check valve 42 to shift it so as to establish a connection from the pipe 156 to the pipe 43 leading to the forward throttle actuator 12. From previous description it will be recalled that fluid under pressure from the pipe 43 flows to the chamber on the spring side of the piston 34b in the piston portion 34 of the actuator 12, as well as to the release insuring valve device which effects the independent release of fluid under pressure from the pressure chamber 34a.

As a result, therefore, the piston 34b of the actuator 12 is promptly and rapidly restored to the position corresponding to that to which it would be restored if the controller handle 11a were restored to the Forward Turbine Engaged position, in which the throttle valve cuts off the supply of steam to the forward direction turbine.

Concurrently with the operation of the forward throttle actuator 12 to effect cut off of the supply of steam to the forward direction turbine as just described, the brake and sanding control valve 18 operates in response to the reduction of the pressure in the piston chamber 189 to effect, sequentially, the supply of fluid under pressure to the sanding valve 19 and, at the limited pressure of approximately eight pounds per square inch, to the brake cylinder 26 in the manner previously described.

As a result of the cut off of steam to the forward direction turbine, the sanding of the rails, and the light brake application effected on the driver wheels as just described, the spinning of the driver wheels is promptly and rapidly terminated so as to prevent serious wear on the rails and tread surfaces of the driver wheels as well as the wastage of steam.

When the spinning of the driver wheels of the locomotive is terminated and the pilot valve device 53 of the wheel slip controller 14 is consequently restored to its closed position terminating the reduction of the pressure in the pilot valve pipe 55, the throttle vent valve 15 and the brake and sanding control valve 18 are not necessarily restored instantly or promptly to their normal conditions unless the pressure reduction valve 85 of the throttle vent valve is reseated in response to the reduction of the pressure in the pipe 83 and the connected control valve portion 35 of the forward throttle actuator to below eighteen pounds per square inch.

As previously indicated, the time lag required to build-up sufficient pressure in the piston chamber 96 to effect restoration of the piston valve device 58 downwardly to the normal position in which it is shown in Figure 2 is such as to cause the reduction of the pressure in the pipe 83 and the connected control valve portion 35 of the forward throttle actuator 12 to continue for a slight interval of time so that the pressure in the control valve portion 35 actually reduces to some value lower than the eighteen pounds per square inch, such as for example five pounds per square inch.

It will be apparent, therefore, that once operation of the throttle vent valve 15 is initiated, the reduction of the pressure in the control valve portion of the forward throttle actuator 12 continues automatically so as to insure the complete closure of the throttle valve controlling the supply of steam to the forward direction turbine.

Upon the restoration of the piston valve device 58 of the throttle vent valve 15 to the normal position thereof in which it is shown in Figure 2 as just described the annular cavity 77 reestablishes communication through which fluid is supplied from pipe 81 to the pipe 83 and thence to the control valve portion 35 to restore the pressure therein to that corresponding to the position of the controller handle 11a, and cavity 78 reestablishes communication between the pipe 80 and the exhaust port 79 to effect the venting of fluid under pressure from the chamber on the spring side of the piston 34b of the actuator 12.

Restoration of the pressure in the piston chamber 189 of the brake and sanding control valve in accordance with the restoration of the pressure in the pilot valve pipe 55 causes the piston assembly to be shifted promptly in a left-hand direction to the normal position thereof in which it is shown in Figure 2. Fluid under pressure is accordingly rapidly vented from the brake cylinder 26 past check valve 206 and through the exhaust port 200 to effect the release of the light brake application effected on the spinning wheels. At the same time, fluid under pressure is similarly rapidly vented from the piston chamber 224 of the sanding valve 19, through the exhaust port 200, to effect prompt termination of sanding of the rails.

If, upon operation of the forward throttle actuator 12 to again open the throttle valve controlling the supply of steam to the forward direction turbine, the driver wheels again begin to spin, the above operation is repeated automatically. Thus at no time are the driver wheels permitted to spin longer than the operating time elapsing between the response of the wheel slip controller 14 to the incipiency of the spinning condition and the closing of the throttle valve. For all practical purposes it may be said that the spinning condition is terminated almost instantaneously upon the occurrence thereof, so that serious wear of the tread surface on the driver wheels due to spinning is prevented.

The above operation of the throttle vent valve 15 has been described in connection with automatic throttle control for the forward direction of travel. However, the throttle vent valve 15 is operative in substantially the same manner to control the operation of the reverse throttle actuator in the event that spinning of the driver wheels occurs during propulsion or initiation of propulsion of the locomotive in the reverse direction. In order to explain more fully the function of the selector valves 20 and 21 in this connection, a brief description of the charging of the equipment will now be given for operation of the controller handle 11a in the reverse throttle zone.

Let it be assumed that the locomotive is stopped and that the controller handle 11a has been shifted transversely from the Forward Turbine Engaged position to the Reverse Turbine Engaged position. As previously indicated, the reverse direction turbine is connected through a hydraulically controlled clutch, in the Reverse Turbine Engaged position of the controller handle 11a, to drive the driver wheels in a reverse direction. At the same time, fluid at six to eight pounds per square inch is supplied through the reverse throttle pipe 46 to the control valve portion 35 of the reverse throttle actuator 13 by way of the port 163 in the cut-out cock 23, pipe 150, branch pipe 150a, pipe 158, past the valve element of the double check valve 82 which is automatically shifted to establish a connection between the pipe 158 and the pipe 81, thence by way of the pipe 81, cavity 77 of the piston valve device 58 of the throttle vent valve 15, pipe 83, past the unseated piston 140 of selector valve 20 which is unseated in response to the fluid pressure in the pipe 150a active on the piston 139, pipe 155, port 164 of the cut-out cock 23 and pipe 47 to the control valve portion 35 of actuator 13.

At the same time, fluid under pressure in pipe 150 is transmitted through the branch pipe 150b to act on the piston 139 of the selector valve 21 to shift the piston assembly in the right-hand direction to the position in which it is shown in Figure 1 wheren the piston 140 is unseated. The end of the double check valve 49 opposite to that through which fluid under pressure is simultaneously being supplied under the control of the controller 11 through the reverse release pipe 48 is therefore connected to atmosphere to permit the fluid under pressure from the pipe 48 to be supplied to the pipe 50 and thence to the chamber on the spring side of the piston 34b of the reverse throttle actuator 13. It will be seen that the said end of the double check valve 49 is connected to atmosphere by way of the pipe 157, past the unseated piston 140 of the selector valve 21, port 80a, pipe 80, cavity 78 of the piston valve device 58 of the throttle vent valve 15, and atmospheric exhaust port 79.

At the same time, fluid under pressure in the pipe 150 shifts the valve element of the double check valve 194 to a position establishing a connection from the pipe 150 to the pipe 193 from which fluid under pressure flows past the valve element of the double check valve 191 and through pipe 190 to the slide valve chamber 180 of the brake and sanding control valve 18.

The piston chamber 96 of the throttle vent valve 15, the pilot valve pipe 55, and the piston chamber 189 of the brake and sanding control valve 18 are charged by flow of fluid under pressure from the pipe 81 in the same manner previously described for operation of the controller 11 in the forward throttle zone.

When the controller handle 11a is shifted to the Reverse Throttle Closed position, the pressure of the fluid supplied to the reverse throttle pipe 46 and thence to the control valve portion 35 of the reverse throttle actuator 13 is increased to ten pounds per square inch. At the same time, fluid under pressure is vented to atmosphere from the reverse release pipe 48 and the connected chamber on the spring side of the piston 34b of the actuator 13. As previously indicated, in this position of the controller handle 11a, the piston stem 36 of the reverse throttle actuator 13 is moved outwardly sufficiently to open the throttle valve or valves controlling the supply of steam to the reverse turbine sufficiently to supply steam for warming-up purposes but insufficient in amount to cause operation of the turbine.

Assuming further that the controller handle 11a is now shifted to a position in the reverse throttle zone between the Reverse Throttle Closed position and the Reverse Full Throttle position, the pressure of the fluid supplied to the reverse throttle pipe 46 is correspondingly increased to effect a corresponding outward movement in the left-hand direction of the piston stem 36 of the actuator 13. The throttle valve or valves controlling the supply of steam to the reverse direction turbine are thus opened to supply steam in an amount corresponding to the position of the controller handle, thereby causing the reverse direction turbine to exert a propulsion torque on the driver wheels of the locomotive tending to propel it in a reverse direction.

If spinning of the locomotive driver wheels occurs in response to the supply of steam to the reverse direction turbine, the throttle vent valve 15 is operated in response to the reduction of the pressure of fluid in pilot valve pipe 55 by unseating of the pilot valve device 53 of the wheel slip controller 14 to effect venting of fluid under pressure from the control valve portion 35 of reverse throttle actuator 13 through the pipe 83 and exhaust port 68 as well as to supply fluid under pressure from the pipe 81 to the pipe 80 leading past the double check valve 49 to the pipe 50 and thence to the chamber on the spring side of the piston 34b of the actuator 13.

The reverse throttle actuator 13 is thus operated in response to operation of the throttle vent valve 15 to cause complete closure of the throttle valve or valves controlling the supply of steam to the reverse direction turbine.

At the same time, the brake and sanding control valve 18 is operated in response to the reduction of the pressure in the piston chamber 189 corresponding to the reduction of the pressure in the pilot valve pipe 55, to effect a light application of the brakes on the spinning wheels and a sanding operation in the same manner previously described for operation of the controller handle 11a in the forward throttle zone.

Upon the reclosure of the pilot valves device 53 of the wheel slip controller 14 and the reclosing of the pressure reduction valve 85 of throttle vent valve 15 in response to the reduction of the pressure in the chamber 89 thereof, the throttle vent valve is promptly restored to its normal condition in which the piston valve device 58 restores those communications, previously described, through which fluid under pressure is supplied to the control valve portion 35 of the throttle actuator 13 and released from the chamber on the spring side of the piston 34b of the actuator 13.

It will be seen that the check valve 24 and 25 function to prevent the supply of fluid under pressure from the forward throttle pipe 39 to the control valve portion 35 of the forward throttle actuator 12 and from the reverse throttle pipe 46 to the control valve portion 35 of reverse throttle actuator 13, respectively, whenever the throttle vent valve 15 is operated to reduce the pressure in the control valve portion 35 of the two actuators. It will be apparent, moreover, that reduction of the pressure in the control valve portion 35 of the two actuators 12 and 13 by operation of the controller 11 remains at all times under the control of the engineer. Thus rapid and prompt reduction of the pressure in the control valve portions 35 of the two actuators 12 and 13 directly through the check valves 24 and 25 is assured independently of the charging communication to the control valve portions 35 controlled by the throttle vent valve 15.

If it is desired, for any reason, such as to repair certain of the devices providing the automatic control of the throttle actuators 12 and 13, such devices may be cut out of operation by turning the operating handle 162 of each of the two cut-out cocks 22 and 23 to a position in quadrature to that in which they are shown. In such position of the valve element 159 of each of the cut-out cocks 22 and 23 communication is established directly through the corresponding port 165 from the forward throttle pipe 39 to the pipe 40 and from the reverse throttle pipe 46 to the pipe 47. In such case, therefore, the actuators 12 and 13 will be operated in the usual manner under the control of the controller 11 as previously described. However, since the pipes 150, 151, 154 and 155 are closed at the corresponding cut-out cocks 22 and 23, it will be seen that no fluid under pressure will be supplied to the pipe 81 and consequently the piston chamber 96 of the throttle vent valve 15, the pilot valve pipe 55, the piston chamber 189 and the slide valve chamber 180 of the brake and sanding control valve 18 will remain uncharged. Thus should spinning of the driver wheels occur, unseating of the pilot valve device 53 of the wheel slip controller 14 will be without effect.

If for any reason it is desired to cause the brake and sanding control valve to effect only a light brake application and no sanding operation, the valve 202 may be closed manually to prevent the supply of fluid under pressure to the sanding valve 19 upon the operation of the brake and sanding control valve. Conversely, if it is desired to cause only a sanding operation in response to operation of the brake and sanding control valve 18, the valve 211 interposed in the pipe 210 through which fluid under pressure supplied to the brake cylinder 26 may be closed to prevent the supply of fluid under pressure to the brake cylinder.

If it is desired for any reason to eliminate both functions of the brake and sanding control valve 18, then both valves 202 and 211 may be closed.

If the engineer desires to effect a sanding operation at any time either upon starting or during a brake application effected in the manner hereinafter to be described, he may do so by operating a suitable device to cause fluid under pressure to be supplied to the pipe 204. For example, the well-known bail-operated sanding valve responsive to downwardly applied pressure on the brake valve handle may be employed for this purpose. Fluid pressure so supplied acts to shift the valve element of the double check valve 203 to its opposite position wherein communication is established from the pipe 204 to the pipe 205, whence the fluid under pressure flows to the piston chamber 224 of the sanding valve 19.

(b) Brake operation

Now let it be supposed that while the locomotive is traveling along the road under propulsion power the operator or engineer desires to initiate a brake application to bring the locomotive or train to a stop. To do so, he first restores the controller handle 11a from the position in the forward throttle zone or reverse throttle zone to the Forward Turbine Engaged or Reverse Turbine Engaged position, depending upon the operating zone in which the controller handle happens to be. The corresponding throttle actuator 12 or 13 is accordingly operated to close the throttle valve or valves controlling the supply of steam to the forward direction turbine or to the reverse direction turbine.

Following such operation of the controller 11, the operator or engineer then shifts the handle of the brake valve 27 out of its normal brake release position into its application zone an amount corresponding to the desired degree of brake application.

The control pipe 28 is accordingly charged to a pressure corresponding to the position of the brake valve handle in its application zone such as, for example, fifty pounds per square inch. Upon the charging of the control pipe 28 as just described, the corresponding fluid pressure established in the piston chamber 130 of the transfer valve 17 acts on the piston 115 to shift the piston assembly in the righthand direction to the position in which the cavity 132 of slide valve 125 connects the pilot valve pipe 55 to the pipe 107 leading to the brake vent valve 16 and cuts off the connection between the pilot valve pipe 55 and pipe 99 leading to the throttle vent valve 15.

At the same time, the slide valve chamber 180 of the brake and sanding control valve 18 is charged with fluid under pressure from the control pipe 28 by way of the branch pipe 192, double check valve 191 and pipe 190. By reason of the fact that the piston chamber 189 of the brake and sanding control valve 18 is being simultaneously built-up in accordance with the build-up of pressure in the pilot valve pipe 55 through the communication extending from the control pipe 28 by way of the branch pipe 108, brake vent valve 16, pipe 107, and cavity 132 in the slide valve 125 of the transfer valve 17, it will be seen that the piston assembly of the brake and sanding control valve 18 remains in the normal position in which it is shown.

Fluid under pressure flows from the control pipe 28 by way of the pipe 108 and the normal communication established through the brake vent valve 16 to the pipe 109, past the double check valve 110, and pipe 111 to the brake cylinder 26 so that the pressure established in the brake cylinder corresponds to that established in the control pipe 28. The brakes are accordingly applied on the driver wheels of the locomotive to a degree corresponding to the pressure established in the control pipe 28.

So long as the degree of the brake application exerted on the driver wheels of the locomotive is ineffective to cause a slipping of the driver wheels, no variation in the pressure of the fluid in the brake cylinder 26 occurs except in response to variation of the pressure in the control pipe 28 under the control of the engineer.

If, however, due to the brake application effected on the driver wheels of the locomotive, a slipping condition thereof is induced, the pilot valve device 53 of the wheel slip controller 14 is unseated to effect a rapid reduction of the pressure in the pilot valve pipe 55. The brake vent valve 16 is accordingly promptly operated to cut off the supply of fluid under pressure from the control pipe 28 to the brake cylinder 26 and to establish a communication through which fluid under pressure is rapidly vented from the brake cylinder 26 through the pipe 109 and an exhaust port at the vent valve. The slipping wheels promptly cease to decelerate and accelerate back to a speed corresponding to locomotive speed due to the reduction in brake cylinder pressure effected as just described. This reduction of the pressure in the brake cylinder 26 continues automatically, notwithstanding the reseating or reclosing of the pilot valve device 53 of the wheel slip controller 14 at the time the slipping wheels are restored substantially to locomotive speed, until such time as the pressure in the brake cylinder 26 reduces to a low value, such as five pounds per square inch. At such time, the brake vent valve is automatically restored to the condition terminating the further reduction of the pressure in the brake cylinder and establishing the communication through which fluid under pressure is again supplied from the control pipe 28 to the brake cylinder to effect reapplication of the brakes on the driver wheels of the locomotive.

Should the driver wheels of the locomotive again begin to slip upon reapplication of the brakes, the pilot valve device 53 is again unseated to effect a rapid reduction of the pressure in the pilot valve pipe 55 and a consequent operation of the brake vent valve 16 to reduce the degree of brake application to a low value and then restore the brake application to a degree corresponding to the pressure established in the control pipe 28.

At no time, therefore, are the wheels permitted to become locked and slide.

It will be apparent that at the same time that the brake vent valve 16 is operated to reduce the degree of application of the brakes in response to the operation of the wheel slip controller 14, the brake and sanding control valve 18 is also operated in response to the reduction of the pressure in the piston chamber 189 thereof in correspondence with the reduction of the pressure in the pilot valve pipe 55 to cause fluid under pressure to be supplied from the slide valve chamber 180 to the piston chamber 224 of the sanding valve 19. Thus sanding of the rails is effected concurrently with the reduction of pressure in the brake cylinder to assist in terminating the slipping condition of the driver wheels.

When the brake and sanding control valve is restored to its normal condition in response to the recharging of the piston chamber 189 thereof in correspondence with the recharging of the pilot valve pipe 55 following reclosure of the pilot valve device 53 of the wheel slip controller 14, fluid under pressure is vented from the piston chamber 224 of the sanding valve 19 through the exhaust port 200 of the brake and sanding control valve 18 to thereby effect termination of the sanding. Automatic sanding occurs, therefore, substantially only while the wheels are in a slipping condition.

It will be apparent that the supply of fluid under pressure to the pipe 210 leading to the double check valve 110 effected by the brake and sanding control valve 18 is, in this instance, without effect for the reason that the higher pressure supplied from the control pipe 28 by way of the brake vent valve 16 maintains the valve element of the double check valve 110 seated against the lower pressure of six to eight pounds per square inch supplied into the pipe 210 by the brake and sanding control valve 18.

When the locomotive or train comes to a stop in response to the brake application effected as just described, the brakes remain applied according to the pressure established in the brake cylinder 26 in correspondence with the pressure of the fluid established in the control pipe 28.

It will be apparent that the engineer may reduce the pressure in the control pipe 28 from that originally established as the locomotive and train reduce in speed in approaching a stop to effect a corresponding reduction in the degree of application of the brakes on the driver wheels of the locomotive and on the cars of the train. Also, after the locomotive or train has come to a stop, the engineer may increase the pressure in the control pipe 28 to effect a corresponding increase in the degree of brake application, if desired for any reason, such as to insure holding the locomotive and train against creepage on a grade.

When the engineer again desires to start the locomotive or train, he will of course first release the brakes by restoring the brake valve handle to its normal or brake release position to reduce the pressure in the control pipe 28 to its normal or atmospheric pressure. The fluid under pressure in the brake cylinder 26 will thus be vented to atmosphere by flow back through the brake vent valve 16 to the control pipe 28 and thence to atmosphere through the exhaust port of the brake valve 27.

Having now described my invention, what I claim as new and desire to secure by Letters Patent, is:

1. Apparatus for controlling the slipping condition of vehicle wheels caused by excessive propulsion power or excessive braking power applied thereto, said apparatus comprising brake control means operative to effect a reduction in the degree of a brake application effective on the said vehicle wheels, propulsion power control means operative to effect a reduction in the propulsion power applied to the said vehicle wheels, means operatively responsive to slipping of the said vehicle wheels during propulsion and during a brake application, and means automatically and differently conditioned dependent upon a brake application being or not being in effect for rendering the said wheel slip responsive means operative to control only the brake control means during a brake application and operative to control only the propulsion power control means during propulsion while no brake application is in effect.

2. Apparatus for controlling the slipping condition of the wheels of a vehicle of the type having means under the control of the operator of the vehicle for effecting a brake application on the said wheels and for controlling the application of propulsion power to the said wheels, said apparatus comprising the combination of brake control means operative to effect a reduction in the degree of a brake application active on the said wheels of the vehicle, propulsion power control means operative to effect a reduction in the degree of propulsion power applied to the said wheels, means operatively responsive to the slipping of the said wheels of the vehicle during a brake application and during propulsion, and means normally conditioned to cause said slip responsive means to control only the propulsion power control means and automatically conditioned in response to the initiation of a brake application under the control of the operator for causing said slip responsive means to control only said brake control means.

3. Apparatus for controlling the slipping condition of vehicle wheels during propulsion and during a brake application, said apparatus comprising propulsion power control means operative to cut off and reapply propulsion power to the said vehicle wheels, brake control means operative to effect a reduction in the degree of a brake application active on said vehicle wheels and a subsequent increase in the degree of the brake application, identical means operatively responsive to the spinning of said vehicle wheels during propulsion and operatively responsive to the slipping of the said vehicle wheels during a brake application, and means controlling said identical means automatically so as to cause said identical means to be effective to control only the power control means during propulsion and only the brake control means during a brake application.

4. Apparatus for controlling the spinning condition of vehicle wheels induced by excessive propulsion power applied thereto, said apparatus comprising means operative at a time that propulsion power is being applied to the said wheels of the vehicle for effecting cessation of application of propulsion power to the said wheels, brake control means operative to effect an application of braking power to the said wheels, and means operatively responsive to the spinning of the said wheels during propulsion for effecting concurrent operation of said propulsion power control means and said brake control means.

5. Apparatus for controlling the spinning condition of vehicle wheels induced by excessive propulsion power applied thereto, said apparatus comprising means operative at a time that propulsion power is being applied to the wheels of the vehicle for effecting cessation of application of propulsion power to the wheels, brake and sanding control means operative to effect a sanding operation and an application of braking power to the said wheels, and means operatively responsive to the spinning of the said wheels during propulsion for effecting concurrent operation of said propulsion power control means and said brake and sanding control means.

6. Apparatus for controlling the spinning of the driver wheels of a locomotive, said apparatus comprising the combination of a manually operated controller having a forward throttle zone and a reverse throttle zone, a forward throttle actuator operative according to the pressure of fluid supplied thereto under the control of said controller while in the forward throttle zone to effect application of a corresponding degree of propulsion power to the driver wheels of the locomotive, a reverse throttle actuator operative according to the pressure of fluid supplied thereto under the control of said controller while in the reverse throttle zone for effecting application of a corresponding degree of propulsion power to the driver wheels of the locomotive, throttle vent valve means operative to effect a reduction of the pressure of fluid supplied to the one or the other of said actuators to cause a reduction in the degree of application of propulsion power to the driver wheels, selector valve means conditioned automatically depending upon operation of said controller in the forward throttle zone or the reverse throttle zone for rendering said throttle vent valve means effective to selectively reduce the pressure of fluid supplied to said forward throttle actuator or said reverse throttle actuator, and means operatively responsive to the spinning of the driver wheels during propulsion for effecting operation of said throttle vent valve means.

7. Apparatus for controlling the spinning of the driver wheels of a locomotive, said apparatus comprising the combination of a manually operated controller having a forward throttle zone and a reverse throttle zone, a forward throttle actuator operative according to the pressure of fluid supplied thereto under the control of said controller while in the forward throttle zone to effect application of a corresponding degree of propulsion power to the driver wheels of the locomotive, a reverse throttle actuator operative according to the pressure of fluid supplied thereto under the control of said controller while in the reverse throttle zone for effecting application of a corresponding degree of propulsion power to the said driver wheels of the locomotive, throttle vent valve means operative to effect a reduction of the pressure of fluid supplied to the one or the other of said actuators to cause a reduction in the degreee of application of propulsion power to the driver wheels, selector valve means conditioned automatically depending upon operation of said controller in the forward throttle zone or the reverse throttle zone for rendering said throttle vent valve means effective to selectively reduce the pressure of fluid supplied to said forward throttle actuator or said reverse throttle actuator, brake control means operative to effect a brake application on the said driver wheels of the locomotive, and means operatively responsive to the spinning of the said driver wheels during propulsion in either the forward or the reverse direction for effecting the concurrent operation of the throttle vent valve means and of the brake control means.

8. Apparatus for controlling the slipping of the driver wheels of a locomotive, said apparatus comprising the combination of an actuator operative under the control of the operator to control the application of propulsion power to the said driver wheels, throttle control means operative to cause operation of said actuator to cut off the application of propulsion power to the said driver wheels and then reapply propulsion power to the said driver wheels, brake control means operative during a brake application to effect a reduction in the degree of a brake application active on the said driver wheels and a subsequent increase in the degree of application of the brakes active on the said driver wheels, means operatively responsive to the slipping of the said driver wheels during propulsion and during a brake application, a normally uncharged pipe chargeable with fluid under pressure only when a brake application is effected, and transfer valve means normally effective to render the said slip-responsive means effective to cause operation of said throttle control means and conditioned automatically in response to charging of said pipe for rendering the said slip-responsive means effective to cause operation of said brake control means.

9. Apparatus for controlling the slipping of the driver wheels of a locomotive, said apparatus comprising the combination of an actuator operative under the control of the operator to control the application of propulsion power to the driver wheels, throttle control means operative to cause operation of said actuator to cut off the application of propulsion power to the driver wheels and then reapply propulsion power to the wheels, brake control means operative during a brake application to effect a reduction in the degree of application of the brakes active on the driver wheels and a subsequent increase in the degree of application of the brakes active on the drivel wheels, means operatively responsive to the slipping of the driver wheels during propulsion and during a brake application, a normally uncharged pipe chargeable with fluid under pressure only when an application of the brakes is effected, transfer valve means normally effective to render the said slip-responsive means effective to cause operation of said throttle control means and conditioned automatically in response to charging of said pipe for rendering the said slip-responsive means effective to cause operation of said brake control means, and sanding control means operatively responsive to operation of said wheel slip responsive means during propulsion or during a brake application to effect a sanding operation.

10. Apparatus for controlling the spinning of wheels of a vehicle on which a brake application may be effected, said apparatus comprising the combination of propulsion power control means operative under the control of the operator of the vehicle for effecting application of propulsion power to wheels of the vehicle, means automatically operative during propulsion of the vehicle in response to the occurrence of the spinning condition of the wheels for causing operation of said propulsion power control means to effect a reduction in the degree of application of propulsion power to the wheels and a subsequent reapplication of propulsion power to the wheels, and means operative in response to initiation of a brake application for rendering said automatically operative means ineffective to control said propulsion power control means.

11. Apparatus for controlling the spinning of wheels of a vehicle, said apparatus comprising forward propulsion power control means operative under the control of the operator of the vehicle for causing application of propulsion power to the wheels of the vehicle to drive the vehicle in a forward direction, reverse propulsion power control means operative under the control of the operator of the vehicle to cause application of propulsion power to the wheels to drive the vehicle in a reverse direction, means operatively responsive to the spinning of the wheels of the vehicle, means automatically operative to render the said spin-responsive means effective to selectively control the one or the other of said propulsion power control means, depending upon which one is operatively effective, in a manner to cause cessation of application of propulsion power whenever spinning of the vehicle wheels occurs, and means operative in response to initiation of a brake application for rendering the said spin-responsive means ineffective to control both of said propulsion power control means.

12. Apparatus for controlling the spinning of the driver wheels of a locomotive of the type having a manually operated throttle controller and a throttle actuator operatively responsive according to the pressure of fluid supplied thereto under the control of said controller to effect a corresponding application of propulsion power to the driver wheels of the locomotive, said apparatus comprising means providing a communication through which fluid under pressure may be supplied to said throttle actuator under the control of said controller, throttle vent valve means interposed in said communication and normally permitting flow of fluid under pressure through the communication to said actuator and operative to close said communication and establish an exhaust communication through which fluid under pressure is vented from said actuator, and means operatively responsive to the spinning of the driver wheels during propulsion for effecting operation of said throttle vent valve means.

13. Apparatus for controlling the spinning of the driver wheels of a locomotive of the type having a manually operated throttle controller and a throttle actuator operatively responsive according to the pressure of fluid supplied thereto under the control of said controller to effect a corresponding application of propulsion power to the driver wheels of the locomotive, said apparatus comprising throttle vent valve means adapted upon operation thereof to effect sequentially a reduction of the pressure of fluid supplied to said actuator and the resupply of fluid under pressure thereto whereby to cause operation of said actuator to reduce the propulsion power applied to the driver wheels and then reapply an increased propulsion power to the driver wheels, and means operatively responsive to the spining of the driver wheels during propulsion for effecting operation of said throttle vent valve means.

14. Apparatus for controlling the slipping of the driver wheels of a locomotive, said apparatus comprising the combination with a throttle actuator including a piston device operatively responsive according to the pressure of fluid supplied to one side thereof to effect a corresponding application of propulsion power to the driver wheels of the locomotive and adapted to have fluid under pressure supplied to the opposite side thereof to positively restore the piston device to a position terminating the application of propulsion power to the driver wheels and a throttle controller having a certain position in which it causes fluid under pressure to be supplied to the said other side of the piston device and to be released from said one side thereof, said controller being operative out of said certain position in a throttle control zone to cause the release of fluid under pressure from said other side of the piston device and the supply of fluid at different pressures to the said one side of the piston device, of throttle vent valve means operative to cause a reduction of the fluid pressure supplied to the said one side of the piston device and to cause the supply of fluid under pressure to the said other side of the piston device thereby to cause termination of the application of propulsion power to the driver wheels notwithstanding that the said controller is in a position calling for the application of propulsion power to the driver wheels, and means operatively responsive to the slipping of the driver wheels during propulsion for effecting operation of said throttle vent valve means.

15. Apparatus for controlling the slipping of the driver wheels of a locomotive, said apparatus comprising the combination with a throttle actuator including a piston device operatively responsive according to the pressure of fluid supplied to one side thereof to effect a corresponding application of propulsion power to the driver wheels of the locomotive and adapted to have fluid under pressure supplied to the opposite side thereof to positively restore the piston device to a position terminating the application of propulsion power to the driver wheels and a throttle controller having a certain position in which it causes fluid under pressure to be supplied to the said other side of the piston device and to be released from said one side thereof, said controller being operative out of said certain position in a throttle control zone to cause the release of fluid under pressure from said other side of the piston device and the supply of fluid at different pressures to the said one side of the piston device, of throttle vent valve means having a normal position establishing communication through which fluid under pressure is supplied under the control of said controller to said actuator to effect the supply of fluid under pressure to said one side of the piston device and operative to a different position in which the supply of fluid under pressure to the actuator is cut off and fluid under pressure is vented from the actuator to effect venting of fluid under pressure from said one side of the piston device, said throttle vent valve means being simultaneously effective to cause fluid under pressure to be supplied to the said other side of the piston device to positively restore the piston device to a position terminating the application of propulsion power to the driver wheels of the locomotive, and means responsive to the spinning condition of the driver wheels during propulsion for effecting operation of said throttle vent valve means.

16. Apparatus for controlling the slipping of the driver wheels of a locomotive, said apparatus comprising the combination with a throttle actuator including a piston device operatively responsive according to the pressure of fluid supplied to one side thereof to effect a corresponding application of propulsion power to the driver wheels of the locomotive and adapted to have fluid under pressure supplied to the opposite side thereof to positively restore the piston device to a position terminating the application of propulsion power to the driver wheels and a throttle controller having a certain position in which it causes fluid under pressure to be supplied to the said other side of the piston device and to be released from said one side thereof, said controller being operative out of said certain position in a throttle control zone to cause the release of fluid under pressure from said other side of the piston device and the supply of fluid at different pressures to the said one side of the piston device, of throttle vent valve means operative in response to a predetermined reduction of control fluid pressure to effect the reduction of the pressure of the fluid supplied to the said one side of the piston device to a certain value while at the same time causing fluid under pressure to be supplied to the said other side of the piston device, said throttle vent valve means being automatically restored to its normal position causing fluid under pressure to be resupplied to the said one side of the piston device under the control of the said controller and causing venting of fluid under pressure from the said other side of the piston device, and means operatively responsive to the slipping of the driver wheels of the locomotive during propulsion for effecting said predetermined reduction of control fluid pressure for the throttle vent valve means to cause operation thereof.

17. Apparatus for controlling the slipping of the driver wheels of a locomotive, said apparatus comprising the combination with a throttle actuator including a piston device operatively responsive according to the pressure of fluid supplied to one side thereof to effect a corresponding application of propulsion power to the driver wheels of the locomotive and adapted to have fluid under pressure supplied to the opposite side thereof to positively restore the piston device to a position terminating the application of propulsion power to the said driver wheels and a throttle controller having a certain position in which it causes fluid under pressure to be supplied to the said other side of the piston device and to be released from said one side thereof, said controller being operative out of said certain position in a throttle control zone to cause the release of fluid under pressure from said other side of the piston device and the supply of fluid at different pressures to the said one side of the piston device, of throttle vent valve means operative to cause a reduction of the fluid pressure supplied to the said one side of the piston device and to cause the supply of fluid under pressure to the said other side of the piston device thereby to cause termination of the application of propulsion power to the said driver wheels notwithstanding that the said controller is in a position calling for the application of propulsion power to the said driver wheels, brake control means operative to effect a brake application on the said driver wheels of the locomotive, and means operatively responsive to the slipping of the said driver wheels during propulsion for effecting concurrent operation of said throttle vent valve means and said brake control means.

18. Apparatus for controlling the slipping of the driver wheels of a locomotive, said apparatus comprising the combination with a throttle actuator including a piston device operatively responsive according to the pressure of fluid supplied to one side thereof to effect corresponding application of propulsion power to the driver wheels of the locomotive and adapted to have fluid under pressure supplied to the opposite side thereof to positively restore the piston device to a position terminating the application of propulsion power to the driver wheels and a throttle controller having a certain position in which it causes fluid under pressure to be supplied to the said other side of the piston device and to be released from said one side thereof, said controller being operative out of said certain position in a throttle control zone to cause the release of fluid under pressure from said other side of the piston device and the supply of fluid at different pressures to the said one side of the piston device, of throttle vent valve means operative to cause a reduction of the fluid pressure supplied to the said one side of the piston device and to cause the supply of fluid under pressure to the said other side of the piston device thereby to cause termination of the application of propulsion power to the driver wheels notwithstanding that the said controller is in a position calling for the application of propulsion power to the driver wheels, sanding control means operative to effect a sanding operation, and means responsive to the slipping of the driver wheels during propulsion for effecting concurrent operation of said throttle vent valve means and said sanding control means.

19. Apparatus for controlling the slipping of driver wheels of a locomotive, said apparatus comprising the combination with a throttle actuator including a piston device operatively responsive according to the pressure of fluid supplied to one side thereof to effect a corresponding application of propulsion power to the driver wheels of the locomotive and adapted to have fluid under pressure supplied to the opposite side thereof to positively restore the piston device to a position terminating the application of propulsion power to the driver wheels and a throttle controller having a certain position in which it causes fluid under pressure to be supplied to the said other side of the piston device and to be released from said one side thereof, said controller being operative out of said certain position in a throttle control zone to cause the release of fluid under pressure from said other side of the piston device and the supply of fluid at different pressures to the said one side of the piston device, of throttle vent valve means operative to cause a reduction of the fluid pressure supplied to the said one side of the piston device and to cause the supply of fluid under pressure to the said other side of the piston device thereby to cause termination of the application of propulsion power to the driver wheels notwithstanding that the said controller is in a position calling for the application of propulsion power to the driver wheels, brake and sanding control means operative to effect a brake application on the driver wheels of the locomotive and a sanding operation, and means operatively responsive to the slipping of the driver wheels during propulsion for effecting concurrent operation of the throttle vent valve means and of the brake and sanding control means.

20. Apparatus for controlling the slipping of the driver wheels of a locomotive, said apparatus comprising the combination with a throttle actuator including a piston device operatively responsive according to the pressure of fluid supplied to one side thereof to effect a corresponding application of propulsion power to the driver wheels of the locomotive and adapted to have fluid under pressure supplied to the opposite side thereof to positively restore the piston device to a position terminating the application of propulsion power to the driver wheels and a throttle controller having a certain position in which it causes fluid under pressure to be supplied to the said other side of the piston device and to be released from said one side thereof, said controller being operative out of said certain position in a throttle control zone to cause the release of fluid under pressure from said other side of the piston device and the supply of fluid at different pressures to the said one side of the piston device, of throttle vent valve means, operative to cause a reducetion of the fluid pressure supplied to the said one side of the piston device and to cause the supply of fluid under pressure to the said other side of the piston device thereby to cause termination of the application of propulsion power to the driver wheels notwithstanding that the said controller is in a position calling for the application of propulsion power to the driver wheels, brake and sanding control means operative to effect sequentially a sanding operation and a certain uniform degree of brake application on the driver wheels, and means operatively responsive to the slipping of the driver wheels during propulsion for effecting operation of said throttle vent valve means and of said brake and sanding control means.

21. Apparatus for controlling the slipping of the driver wheels of a locomotive, said apparatus comprising the combination with a controller operative to cause fluid at different pressures to be supplied to effect a corresponding degree of application of propulsion power to the driver wheels of the locomotive, of brake control valve means having a chamber charged by fluid under pressure being supplied to effect application of propulsion power to the said driver wheels of the locomotive and operative in response to a reduction of the pressure of the fluid in said chamber, while the controller is operative to continue the supply of fluid under pressure for application of propulsion power to the said driver wheels, for causing application of the brakes on the said driver wheels of the locomotive to a certain uniform degree, and means operatively responsive to the slipping of the said driver wheels during propulsion for effecting a reduction of the pressure in the said chamber of the brake control valve means.

22. Apparatus for controlling the slipping of the driver wheels of a locomotive, said apparatus comprising the combination with a controller operative to cause fluid at different pressures to be supplied to effect a corresponding degree of application of propulsion power to the driver wheels of the locomotive, of a brake control valve mechanism comprising a piston assembly having three pistons of different pressure areas respectively, a first chamber between two of said pistons charged with fluid under pressure being supplied to effect application of propulsion power to the said driver wheels of the locomotive for exerting a force on the piston assembly urging it in one direction, a second chamber at one side of the third of said pistons charged with fluid under pressure being supplied to effect application of propulsion power to the said driver wheels of the locomotive for urging said piston assembly in the opposite direction, said piston assembly remaining in a certain normal position so long as both of said chambers are simultaneously charged and discharged and being operative in response to the reduction of the pressure in said second chamber, without reduction of the pressure in said first chamber, to effect movement of the piston assembly in a manner to effect a predetermined degree of brake application on the said driver wheels of the locomotive, and means operatively responsive to the slipping of the said driver wheels during propulsion for effecting a reduction of the pressure in said second chamber of the brake control valve mechanism.

23. Apparatus for controlling the slipping of the driver wheels of a locomotive, said apparatus comprising the combination with a throttle controller operative to effect the supply of fluid at different pressures to cause a corresponding degree of application of propulsion power to the driver wheels of a locomotive, of a brake and sanding control valve mechanism comprising a piston assembly having three pistons of different pressure areas respectively, a first chamber between two of said pistons adapted to be charged by fluid under pressure being supplied to effect application of propulsion power to the driver wheels of the locomotive whereby to cause a force to be exerted on the piston assembly urging it in one direction, a second chamber on the outside of the third piston adapted to be charged with fluid under pressure being supplied to effect application of propulsion power to the driver wheels of the locomotive thereby to cause a force to be exerted on said piston assembly in the opposite direction, said piston assembly remaining in a normal position so long as fluid under pressure is concurrently supplied to or concurrently released from said first and said second chambers and being operative in response to the reduction of the pressure in said second chamber, without reduction of pressure in said first chamber, to effect a sanding operation and a certain uniform degree of brake application on the driver wheels of the locomotive, and means operatively responsive to the slipping of the driver wheels during propulsion for effecting a reduction of the pressure in said second chamber of the brake and sanding control valve mechanism.

24. Apparatus for controlling the slipping of the driver wheels of a locomotive, said apparatus comprising the combination with a throttle controller operative to cause fluid under pressure to be supplied at different pressures to effect a corresponding degree of application of propulsion power to the driver wheels of the locomotive, of brake and sanding control mechanism comprising a control chamber adapted to be charged with fluid being supplied to effect application of propulsion power to the driver wheels of the locomotive, and fluid pressure responsive valve means operative in response to a reduction of the pressure in the said control chamber, while said controller is operative to continue the supply of fluid under pressure to effect application of propulsion power to the driver wheels, to effect a sanding operation and a certain uniform degree of brake application on the driver wheels of the locomotive; and means operatively responsive to the slipping of the driver wheels of the locomotive during propulsion for effecting a reduction of the pressure in said control chamber.

25. Apparatus for controlling the slipping of the wheels of a vehicle, said apparatus comprising the combination of a control pipe chargeable with fluid at different pressures according to the degree of the desired brake application, a brake cylinder, brake vent valve means normally establishing a communication through which fluid under pressure may be supplied from the control pipe to the brake cylinder to effect a brake application on the wheels of the vehicle, said brake vent valve means having a control chamber chargeable with fluid under pressure being supplied to the brake cylinder and being operative in response to a predetermined reduction of the pressure in the control chamber to cut off the supply of fluid under pressure to the brake cylinder and to effect a rapid reduction of the pressure in the brake cylinder, a sanding control valve device having a piston assembly comprising three pistons of different pressure areas respectively, a first chamber between two of said pistons charged with fluid supplied from said control pipe whereby a force is exerted on said piston assembly urging it in one direction, a second chamber outside the third of said pistons connected to the control chamber of said brake vent valve means and chargeable with fluid at a corresponding pressure, said piston assembly remaining in a certain normal position so long as the pressure in the said first and said second chambers builds-up concurrently or reduces concurrently and being operative upon a reduction of the pressure in the said second chamber, without reduction of the pressure in said first chamber, to cause a sanding operation, and a valve device operatively responsive to slipping of the wheels of the vehicle during a brake application to effect concurrent reduction of the pressure in the control chamber of the brake vent valve means and in said second chamber of said sanding control valve device.

26. Apparatus for controlling the spinning of the wheels of a vehicle, said apparatus comprising fluid pressure operated propulsion power control means operatively responsive to a predetermined reduction of a control fluid pressure for effecting the termination of application of propulsion power to the wheels followed by re-application of power to the wheels of the vehicle, fluid pressure responsive sanding control means operatively responsive to a predetermined reduction of a control fluid pressure for effecting a sanding operation, and valve means operatively responsive to the spinning of the wheels of the vehicle during propulsion for effecting concurrently a reduction in the control fluid pressure for the propulsion power control means and a reduction of the control fluid pressure for the sanding control means.

27. Apparatus for controlling the spinning of the driver wheels of a locomotive, said apparatus comprising fluid pressure operated propulsion power control means operatively responsive to a reduction of a control fluid pressure for sequentially effecting a reduction in the propulsion power applied to the said driver wheels and restoration of power to the said driver wheels, fluid pressure responsive brake control means operatively responsive to a reduction of a control fluid pressure for effecting a brake application on the said driver wheels, and valve means operatively responsive to the spinning of the said driver wheels during propulsion for concurrently effecting a reduction of the said control fluid pressures for said propulsion power control means and for said brake control means.

28. Apparatus for controlling the slipping of the driver wheels of a locomotive, said apparatus comprising the combination of a controller operative to cause fluid at different pressures to be supplied to effect a corresponding degree of application of propulsion power to the driver wheels of the locomotive, sanding control valve means having a chamber charged by fluid under pressure being supplied to effect application of propulsion power to the driver wheels of the locomotive and operative in response to a reduction of the pressure of the fluid in said chamber, while the supply of fluid under pressure to cause the application of propulsion power to the driver wheels is maintained for causing a sanding operation, and means operatively responsive to the slipping of the driver wheels during propulsion for effecting a reduction of the pressure in the said chamber of the sanding control valve means.

29. Apparatus for controlling the spinning of the wheels of a vehicle during propulsion, said apparatus comprising fluid pressure responsive valve means operatively responsive to the reduction of a control fluid pressure for effecting a sanding operation and a brake application on the said wheels of the vehicle, and means operatively responsive to the spinning of the said wheels during propulsion for effecting a reduction of the control fluid pressure for said fluid pressure responsive valve means.

30. Apparatus for controlling the spinning of the wheels of a vehicle during propulsion, said apparatus comprising brake and sanding control means operative to effect a sanding operation and a brake application on the wheels, and means operatively responsive to the spinning of the wheels for effecting operation of said brake and sanding control means.

31. Apparatus for controlling the slipping of the wheels of a vehicle, said apparatus comprising the combination of a pipe adapted to be charged with fluid under pressure during propulsion of the vehicle and during a brake application, valve means operatively responsive to the slipping of the wheels of the vehicle during propulsion and to the slipping of the wheels during a brake application, to effect a reduction of the fluid pressure in said pipe, and fluid pressure operated means operatively responsive to the reduction of the pressure in said pipe for effecting a sanding operation either during propulsion or during a brake application.

32. Apparatus for controlling the slipping of vehicle wheels during propulsion of the vehicle and during a brake application on the wheels, said apparatus comprising a pipe, means operative during propulsion of the vehicle to cause charging of said pipe, means operative during a brake application to also cause charging of said pipe, valve means operatively responsive to the slipping of the wheels of the vehicle during propulsion and to the slipping of the wheels during a brake application to effect a reduction of the pressure in said pipe, and fluid pressure responsive means operatively responsive to a reduction of the pressure in said pipe either during propulsion or during a brake application for effecting a sanding operation.

33. Apparatus for controlling the spinning of the wheels of a vehicle during propulsion, said apparatus comprising fluid pressure responsive valve means operative in response to a reduction of a control fluid pressure to effect a certain uniform degree of a brake application on the said wheels of the vehicle, and means operatively responsive to the spinning of the said wheels during propulsion for effecting a reduction of the control fluid pressure for the fluid pressure responsive valve means.

34. Apparatus for controlling the spinning of the wheels of a vehicle during propulsion thereof, said apparatus comprising means operative to effect a brake application on the said wheels of the vehicle, and means operatively responsive to the spinning of the said wheels during propulsion thereof to effect operation of said means.

GEORGE K. NEWELL.

REFERENCES CITED

The following references are of record in the file of this patent:

UNITED STATES PATENTS

| Number | Name | Date |
| --- | --- | --- |
| 1,121,988 | Doyle et al. | Dec. 22, 1914 |
| 2,250,673 | Kew | July 29, 1941 |
| 2,286,680 | Hines | June 16, 1942 |
| 2,321,059 | Anderson | June 8, 1943 |
| 2,332,584 | McCune | Oct. 26, 1943 |
| 2,335,984 | Wilson | Dec. 7, 1943 |
| 2,336,052 | Anderson et al. | Dec. 7, 1943 |
| 2,361,099 | Hines | Oct. 24, 1944 |